US012562584B2

(12) United States Patent

McMurry

(10) Patent No.: US 12,562,584 B2

(45) Date of Patent: Feb. 24, 2026

(54) SYSTEM AND METHOD FOR CHARGING AND UPDATING ELECTRONIC CANDLES

(71) Applicant: Christopher McMurry, Phoenix, AZ (US)

(72) Inventor: Christopher McMurry, Phoenix, AZ (US)

( * ) Notice: Subject to any disclaimer, the term of this patent is extended or adjusted under 35 U.S.C. 154(b) by 0 days.

(21) Appl. No.: 18/329,956

(22) Filed: Jun. 6, 2023

(65) Prior Publication Data

US 2023/0318330 A1 Oct. 5, 2023

Related U.S. Application Data

(63) Continuation of application No. 16/546,042, filed on Aug. 20, 2019, now Pat. No. 11,670,950.

(60) Provisional application No. 62/720,304, filed on Aug. 21, 2018.

(51) Int. Cl.
| | |
|---|---|
| *H02J 7/00* | (2006.01) |
| *F21S 6/00* | (2006.01) |
| *F21S 9/02* | (2006.01) |

(52) U.S. Cl.
CPC ............. *H02J 7/0045* (2013.01); *F21S 6/001* (2013.01); *F21S 9/02* (2013.01)

(58) Field of Classification Search
CPC ............. H02J 7/0045; F21S 6/001; F21S 9/02
USPC ........ 320/115, 107, 128, 137; 362/183, 234, 362/392
See application file for complete search history.

(56) References Cited

U.S. PATENT DOCUMENTS

| | | | | |
|---|---|---|---|---|
| 3,059,780 | A | 10/1962 | Blaise | |
| 4,617,614 | A | 10/1986 | Lederer | |
| 8,070,319 | B2 * | 12/2011 | Schnuckle | ............... H01K 7/06 |
| | | | | 362/249.02 |
| 8,579,461 | B2 | 11/2013 | Fournier et al. | |
| 9,755,438 | B2 | 9/2017 | Thompson | |
| D827,189 | S | 8/2018 | Li | |
| D964,925 | S | 9/2022 | McMurry | |
| 11,670,950 | B2 * | 6/2023 | McMurry | ............... F21S 6/001 |
| | | | | 320/107 |
| 2005/0127872 | A1 | 6/2005 | Lederer | |
| 2008/0247180 | A1 | 10/2008 | Lederer | |
| 2014/0042962 | A1 * | 2/2014 | Thompson | ............ H02J 7/0013 |
| | | | | 320/107 |
| 2014/0175031 | A1 * | 6/2014 | Roberts | .................. A47B 57/20 |
| | | | | 211/26.2 |
| 2014/0203757 | A1 | 7/2014 | Ibragimova et al. | |
| 2017/0264119 | A1 | 9/2017 | Fournier et al. | |
| 2018/0166898 | A1 * | 6/2018 | Schreiber | .............. H02J 7/0013 |

(Continued)

FOREIGN PATENT DOCUMENTS

| | | |
|---|---|---|
| AU | 2015100274 A4 | 4/2015 |
| EP | 2261552 A1 | 12/2010 |

OTHER PUBLICATIONS

Examiner's Search Report From European Patent Office, Application No. 19218547.8, Apr. 21, 2020, 9 Pages.

*Primary Examiner* — Richard V Muralidar

(57) ABSTRACT

A system and method for charging electronic candles. Electronic candles are received in one or more charging bases. The electronic candles are secured in place in the one or more charging bases. The one or more charging bases are received on a charging rack. The one or more charging bases are electrically connected to a power system of the charging rack to charge the electronic candles.

20 Claims, 17 Drawing Sheets

(56) References Cited

U.S. PATENT DOCUMENTS

| | | |
|---|---|---|
| 2018/0245781 A1 | 8/2018 | Oxenford |
| 2019/0123576 A1* | 4/2019 | Longo .................... H02J 50/10 |

* cited by examiner

608

612

612

608

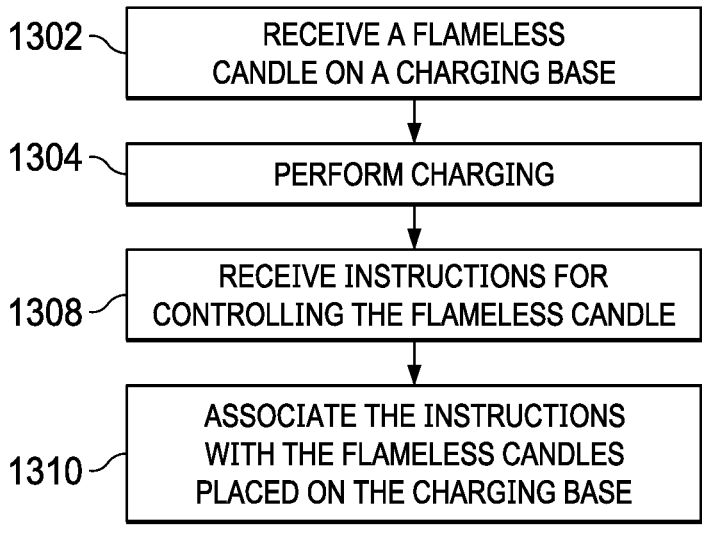

1302 — RECEIVE A FLAMELESS CANDLE ON A CHARGING BASE

1304 — PERFORM CHARGING

1308 — RECEIVE INSTRUCTIONS FOR CONTROLLING THE FLAMELESS CANDLE

1310 — ASSOCIATE THE INSTRUCTIONS WITH THE FLAMELESS CANDLES PLACED ON THE CHARGING BASE

FIG. 13

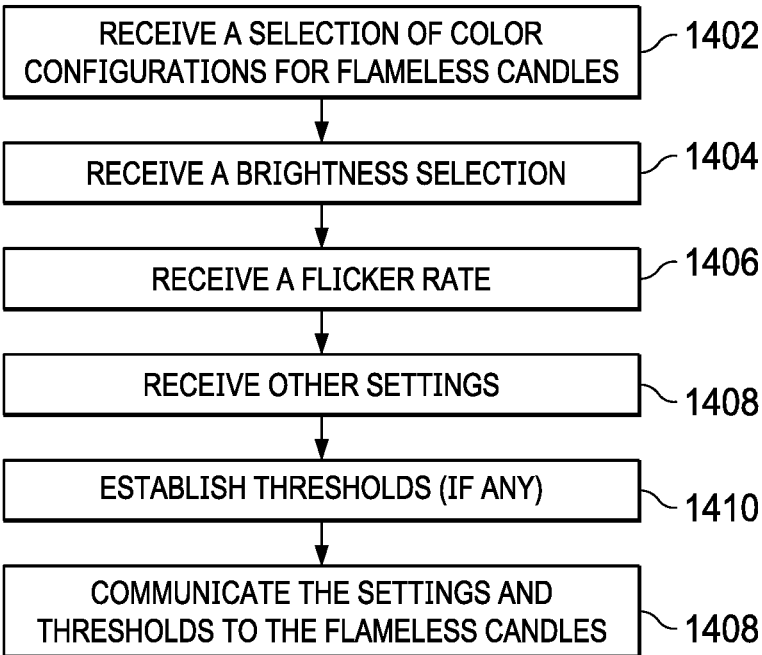

RECEIVE A SELECTION OF COLOR CONFIGURATIONS FOR FLAMELESS CANDLES — 1402

RECEIVE A BRIGHTNESS SELECTION — 1404

RECEIVE A FLICKER RATE — 1406

RECEIVE OTHER SETTINGS — 1408

ESTABLISH THRESHOLDS (IF ANY) — 1410

COMMUNICATE THE SETTINGS AND THRESHOLDS TO THE FLAMELESS CANDLES — 1408

FIG. 14

1502 ASSEMBLE A RACK

1504 INTEGRATE THE POWER DISTRIBUTION SYSTEM

1506 RECEIVE BASES

RECEIVE ELECTRONIC CANDLES IN A BASE 1602

LOCK AND SECURE THE ELECTRONIC CANDLES AGAINST CONTACTS IN THE BASE 1604

POWER THE BASE 1606

CHARGE THE ELECTRONIC CANDLES THROUGH THE CONTACTS 1608

SYSTEM AND METHOD FOR CHARGING AND UPDATING ELECTRONIC CANDLES

PRIORITY

This application is a continuation and claims priority to U.S. utility patent application Ser. No. 16/546,042 filed on Aug. 20, 2019 and which further claims priority to U.S. Provisional Patent Application Ser. No. 62/720,304 entitled FLAMELESS CANDLE AND SHELVES filed on Aug. 21, 2018, the entirety of which is incorporated by reference herein.

BACKGROUND

I. Field of the Disclosure

The illustrative embodiments relate to electronic candles. More specifically, but not exclusively, the illustrative embodiments relate to a flameless candle, a charging and storage rack, charging bases, and applicable methods.

II. Description of the Art

In recent years electronic candles have become increasingly popular because of their numerous benefits with regard to environmental, utilization, and safety considerations. These electronic candles are useful, but offer limited options for bulk usage, recharging, and distribution.

SUMMARY OF THE DISCLOSURE

The illustrative embodiments provide a system and method for charging electronic candles. Electronic candles are received in one or more charging bases. The electronic candles are secured in place in the one or more charging bases. The one or more charging bases are received on a charging rack. The one or more charging bases are electrically connected to a power system of the charging rack to charge the electronic candles.

Another illustrative embodiment provides an electronic candle system. The electronic candle system includes a charging rack for receiving a number of bases. The charging rack includes a number of electrical interfaces for connecting with the number of bases. The electronic candle system also includes the number of bases for securing and charging electronic candles. Each of the number of bases include a number of receptacles for securing the electronic candles into place for charging and storage.

Another illustrative embodiment provides an electronic candle rack. The electronic candle rack includes a number of supports. The electronic candle rack further includes a number of rails extending between supports for supporting a number of charging bases configured to receive a number of electronic candles. The electronic candle rack further includes a number of electrical interfaces for powering the number of charging bases.

Other illustrative embodiments provide a system, method, and flameless candle. One embodiment provides a method for controlling a flameless candle. One or more flameless candles are received on a charging base. Batteries of the one or more flameless candles are charged utilizing wireless induction. Settings for the one or more flameless candles are synchronized including at least brightness, color, and flicker rate. The one or more flameless candles are activated in response to user input.

Another embodiment provides a flameless candle system. The flameless candle system may include a charging base connected to a power source. The charging base includes an inductive charger. The charging base is configured to receive multiple flameless candles. The flameless candles each include a rechargeable battery, charging contacts, one or more light sources, and logic for implementing commands received by each of the multiple flameless candles.

Another embodiment provides a flameless candle. The flameless candle may include a rechargeable battery powering the flameless candle. The flameless candle further includes a transceiver receiving instructions for operating the flameless candle including at least flame color, brightness, and flicker rate. The flameless candle further includes logic for implementing the instructions. The flameless candle further includes one or more light sources for simulating a flame.

BRIEF DESCRIPTION OF THE DRAWINGS

Illustrated embodiments are described in detail below with reference to the attached drawing figures, which are incorporated by reference herein, and where:

FIG. 13 is a flowchart of a process for processing instructions for a flameless candle in accordance with an illustrative embodiment;

FIG. 14 is a flowchart of a process for configuring flameless candles in accordance with an illustrative embodiment;

DETAILED DESCRIPTION OF THE DISCLOSURE

Figure 1:
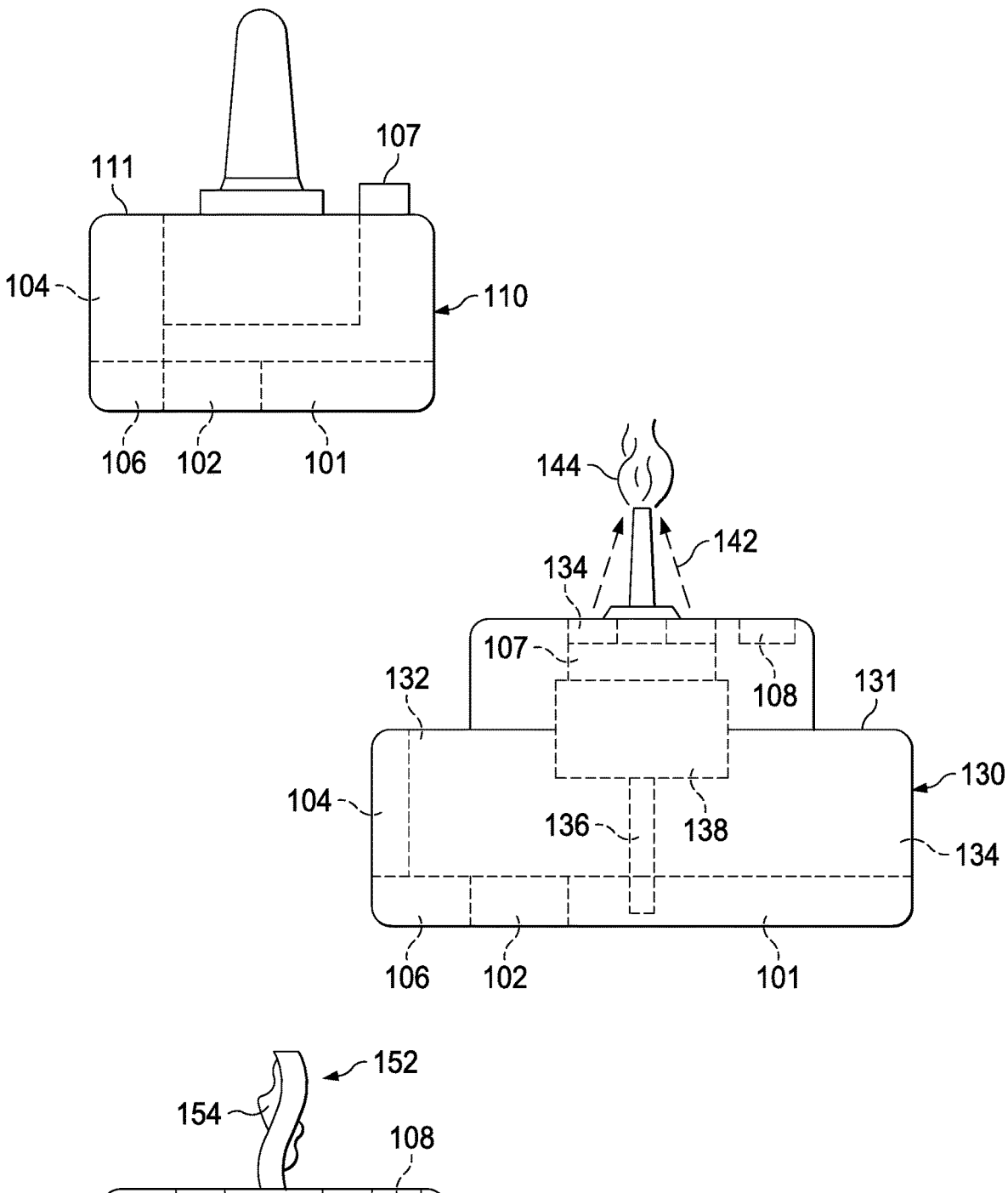
FIG. 1. is a pictorial representation of electronic candles in accordance with illustrative embodiments.

The illustrative embodiments provide a flameless or electronic candle, charging base, charging shelves, charging rack, and storage system. The flameless candle may utilize various configurations and may alternatively be referred to as an electronic candle, smart candle, and/or controllable candle. The electronic candles may be airtight, waterproof, or hermetically sealed. As a result, the electronic candles may be washed or sterilized and utilized in various environments including restaurants, health spas, hotels, hospitals, and other hospitality and entertainment facilities and locations. The electronic candles may also be placed in liquid to float (e.g., floating in a decorative bowl) or a weighted base may be attached to the electronic candle for liquid submersion during utilization. In another embodiment, the buoyancy of the electronic candles may be controlled utilizing the user interface of the electronic candles or wirelessly. As a result, the buoyancy may be controlled in real time.

The illustrative embodiments include electronic candles that may be recharged and programmed utilizing charging bases, trays, racks, receptacles, and associated storage systems. Electronic contacts may be utilized to charge the electronic candles efficiently. The electronic candles may also include chargers that allow the electronic candles to be charged. For example, the electronic candles may be locked into place, such that contacts, pins, or interfaces align to charge and/or communicate data to the electronic candles and secure the electronic candles in place during movement, storage, updating, and so forth. The weighted base may also be utilized to self-balance the electronic candles preventing the electronic candles from tipping over or rolling away. The weighted base adds stability to the electronic candles.

In one embodiment, the lighting component of the electronic candle is a multi-color light emitting diode. The electronic candle may utilize one or more different color spectra at a time. As a result, environment specific lighting (e.g., mood lighting) may be implemented. In addition, the flicker controls or flicker rate of the electronic candle may also be managed. Fragrance emitting components may also be attached to the electronic candle for passive or active dispersion of the selected fragrances. The electronic candle may also emit specific optical, wireless, or other signals to act as beacons, range extenders, location devices, and so forth. The various settings and configurations of the electronic candles (including logic and/or software) may be set, configured, modified, and updated in large numbers utilizing the charging rack and charging bases herein described.

The illustrative embodiments may provide any number of bases, trays, racks, shelves, storage units, and other systems that may be utilized to charge, program, and/or manage the electronic candles. As a result, such systems may include any number of electrical and wireless interfaces for interacting and communicating with the electronic candles. In one embodiment, a charging rack may be configured to receive multiple charging bases that are storing and charging the electronic candles. The charging rack may include a power system including plugs, interfaces, and connectors for powering the charging rack itself, the charging bases and associated electronic candles, and other components. The charging rack may also include a commercial battery, solar cell, or fuel cell for powering the electronic candles away from a traditional power source. The charging rack may be assembled in levels or portions to accommodate the number of electronic candles needed by the user. The size and configuration of the rack, bases, and rows may be set by default or customized as needed by the user.

In one embodiment, the electronic candles may include a receiver or transceiver for communicating with each other, a wireless network, or a wireless device. In one embodiment, the electronic candles or smart bases/frames may be programmed by a smart phone and corresponding mobile application executed to control, manage, and interact with the electronic candles. For example, the applications may communicate with a charging rack securing the bases/rows of electronic candles (directly or through a network) or may communicate directly with the electronic candles. The electronic candles may also be controlled from one or more remote controls associated with the electronic candles. In another embodiment, the flameless candles may interact with control systems, smart systems, or other controllers within the commercial property, residence, or so forth. For example, home or commercial control systems available through any number of manufacturers (e.g., Apple, Google, Amazon, Honeywell, Samsung, LeGrand, etc.) may be utilized to control the flameless candle. Any number of communications standards, protocols, and/or signals may be utilized to communicate with one or more of the electronic candles.

In one embodiment, one or more master electronic candles may control a group of other electronic candles associated with the master electronic candle. The electronic candles utilized in proximity to each other may form a mesh network utilized to distribute information, data, settings or so forth. For example, settings for a first candle may be propagated to a second candle, third candle, and so forth. In one embodiment, only the master electronic candle may include an interface for controlling the settings which may be propagated to any number of other electronic candles associated with the master electronic candle. The electronic candles may be associated utilizing proximity (e.g., within two feet during programming), attached to a single at a base/rack. The electronic candles may also include logic for implementing various settings, parameters, thresholds, preferences, commands, instructions, applications, or so forth. For example, the electronic candles may have their brightness, color, flicker rate, buoyancy or other information adjusted wirelessly utilizing a mobile application executed by a communications or computing device or utilizing an electronic shelf, charging shelf, base station, or so forth. The various programs, settings, changes, or updates may be performed in real-time or near real-time.

The electronic candles may also utilize artificial intelligence, adaptive learning, or historical information/settings to adapt to changing circumstances. For example, in response to determining that the electronic candles have been manually configured to a particular color and intensity settings at a specified time or based on environmental conditions a number of times, the electronic candles may automatically make the change at the corresponding time or based on applicable environmental conditions.

The electronic candles may include any number of decorative bases, covers, shades, or other components. These components may be exchanged as needed to suit the environment, conditions, and/or needs of the user. The bases, covers, or frames of the electronic candles may include any of the functionality of the electronic candles as are herein described. For example, the bases may include a rechargeable battery that interfaces with one or more power components of the electronic candles. The bases or electronic candles may include one or more cords (e.g., retractable, connectable, hidden, etc.) for charging different types of devices. The electronic candles may also be utilized for charging wireless devices, such as smart phones or tablets. The electronic candles may include a battery of sufficient size and capacity to charge any number of wireless devices. As a result, customers at a restaurant may be able to charge their smart phones from the flameless candle while enjoying an evening out.

The electronic candles, charging bases, and shelves may also include inductive chargers for being charged when placed on furniture, trays, or other surfaces with inductive charging devices. The electronic candles, trays, and shelves may also perform inductive charging of other devices (e.g., cell phones, tablets, smart wearables, etc.) that are place on or proximate the electronic candles.

The electronic candles of the illustrative embodiments simulate the look and feel of a natural wax-based candle when activated or "lit" as well as when they are not activated, on, or "lit." As a result, more users, businesses, organizations, and entities may transition to utilizing the electronic candles because of their safety, applicable laws and regulations, industry standards, and so forth. The electronic candles may also provide bulk programming features that uniquely allow the electronic candles to be managed and utilized in large numbers.

In another embodiment, the electronic candles may include logic and hardware for processing transactions implemented through a card (e.g., credit card, debit card, gift card, etc.), wireless device, wireless communications, or so forth. For example, the electronic candle may include a port, slot, or reader for credit cards. The electronic candle may also execute an application for processing transactions associated with the location and/or users of the electronic candle. As a result, the electronic candle may be able to serve any number of aesthetic and functional purposes.

FIG. 1. is a pictorial representation of electronic candles 100 in accordance with illustrative embodiment. The electronic candles 100 are representative of the candles 110, 130, and 150. The electronic candles 100 are configured to best emulate or represent a traditional wax candle with a burning wick. The electronic candles 100 may utilize water vapor/artificial smoke, holographic projection (e.g., lasers, femto lasers, etc.), light bending materials, and/or refraction to best emulate the flame of a burning candle utilizing safe artificial mechanisms. Each of the electronic candles 100 includes a frame 112, 131, 151. The frames 112, 131, 151 are the body and support structure for the various components of the electronic candles 100. The frames 112, 131, 151 may include any number of compartments, separators, tabs, fasteners, recesses, pockets or other defined components to support the components, functions, and operation of the electronic candles 100. The electronic candles 100 may include different frames 112, 131, 151 for supporting differing components, functions, and operation. The embodiments of the electronic candles 100 in FIG. 1 and the other corresponding Figures and description are interchangeable and applicable across all of the Figures and description regardless of restrictions whether natural or artificially contrived. Combinations of the components, features, functions, are expected and suggested herein. The embodiments of the various Figures and corresponding claims incorporate by reference U.S. Pat. No. 8,845,166 and all associated content.

In one embodiment, each of the electronic candles 100 may include a battery 101, a charger 102, logic 104, a transceiver 106, light source 107, and sensors 108. The structure, functionality, composition, shape, size, and configuration of each of these components may vary across the electronic candles 100. In addition, not all of these components may be included in each of the electronic candles 100. For example, some candles may not include sensors and/or logic. In some embodiments, the electronic candles 100 may include any number of switches, buttons, dials, or other interface components for controlling the operation, components, and functionality of the electronic candles 100. These control components may be placed on the inside, top, sides, or bottom of the electronic candles 100. For example, in some embodiments, the sensors 108 may double as a power button for turning the electronic candles 100 on and off. In another example, the sensors 108 may also represent a dial that may be utilized to adjust the brightness, color, or flicker rate of the electronic candles 100 to best fit the applicable environment. In another embodiment, the control components may be enclosed by a cover, panel, or lid. For example, the cover may be a hinged cover that may be rotated to access the control panels. The cover may include a snapping or locking mechanism to secure the cover in place. As a result, the control components may be better protected against wear and tear and inadvertent selections.

The various components of the electronic candles 100 may be airtight, waterproof, for hermetically sealed to prevent liquids or solids from entering the interior portions of the electronic candles 100. For example, a power switch, a brightness button, and a flicker rate button may all be hermetically sealed so that the electronic candles 100 may be utilized in any number of conditions including underwater.

As shown, the candle 130 may include a reservoir 132, a lens, 134, an artificial wick 136, a dispenser 138, and may emit light 142, and vapor 144. The candle 130 utilizes vapor 144 to simulate a flame. The candle 130 may utilize the dispenser 138 to generate the vapor 144. The dispenser 138 draws very little power from the battery 101 and liquid from the reservoir 132 to emit the vapor 144 over long periods of time (e.g., eight hours). The vapor 144 may represent room temperature or heated water vapor, essential oils, or other liquid combinations. The candle 130 may double as a humidifier, vaporizer, diffuser, or other similar device. In one embodiment, the dispenser 138 is an atomizer (e.g., electrostatic, ultrasonic, centrifugal, heating coil, etc.). The atomizer emits very fine droplets of liquid that are illuminated by the light 142 from the light source 107 focused through the lens 134 to emulate a flame. The dispenser 138 may also represent a nebulizer diffuser, ultrasonic diffuser, heat diffuser, evaporative diffuser, or other type of diffuser. Various scented or aromatherapy oils or liquids may be utilized to create a pleasant aroma based on the discharge of the vapor 144. In one embodiment, the reservoir 144 may be removed for cleaning.

The dispenser 138 draws the liquid from the reservoir 132 to generate the extremely fine mist that is then propagated through the candle 130 and out of the artificial wick 136. The dispenser 138 may include one or more tubes, straws, or wicking components for drawing the liquid from the reservoir 132 to the dispenser 138. In other embodiments, the dispenser 138 may be placed within or below the reservoir 132 to ensure the natural flow of the liquid into the dispenser. The dispenser 138 may include any number of valves, gates, or flow regulators for regulating the amount of liquid that is converted into the vapor 144 at any given time.

The light source 107 is powered by the battery 101 and controlled by the logic 104. Any number of wires, pins, connectors, buses, or interfaces may electrically connect the various components of the individual electronic candles 100. The logic 104 may incorporate artificial intelligence, adaptive learning, or historical information/settings to adapt to changing circumstances. For example, in response to determining that the electronic candles 100 have been manually configured to a particular color and intensity settings at a specified time or based on environmental conditions a number of times, the electronic candles 100 may automatically make the change at the corresponding time or based on applicable environmental conditions. In another example, the logic 104 may learn that the electronic candles 100 are turned off at a designated time for each day of the week and may automatically turn themselves off at that time. A mobile application of a wireless device may communicate with the logic 104 to preset operation conditions for individual electronic candles, groups of candles, or all available electronic candles. For example, settings of the electronic candles may be controlled by time period, threshold (e.g., light levels, noise levels, type of music, temperature, movement, proximity, etc.).

The candle 150 may include a polymer wick 152. In one embodiment, the polymer wick 152 may be light sensitive and may deform slightly as the light source 107 is applied to the polymer wick 152. The polymer wick 152 may be symmetrical, asymmetrical, or otherwise shaped to simulate a flame. For example, the polymer wick 152 may be wider at the base and narrow to a tip at the other end to simulate the appearance of a flame from a wax-based candle. The slight motions of the polymer wick 152 may simulate the movement and flicker of a flame. The one or more light sources 152 may be applied to the polymer wick 152 to undergo light-induced shape changes. For example, the polymer may represent an azobenzene-containing liquid-crystal elastomer. The light source 107 may apply different levels and intensity of light to make the polymer wick 152 move or deform. For example, the light source 107 may apply light on a first side of the polymer wick 152 and then on a second side of the polymer wick 152 to make the simulate flame appear as if it is moving like a real flame.

In one embodiment, the polymer wick 152 may represent a waveguide that communicates light emitted from the light source 107. For example, the polymer wick 152 may be hollow or include an optical center (e.g., fiber optic wick) to communicate light. The polymer wick 152 may be hollow and shaped in the figure or outline of a flame. The polymer wick 152 may be asymmetric or symmetric to best emulate a real flame. In one embodiment, the polymer wick 152 may include deformations 154. The deformations 154 may represent extensions, outlets, irregularities, or so forth. The deformations 154 may be utilized to deflect, reflect, or refract light from the light source 107. The deformations 154 may be symmetrical or asymmetrical to better simulate a flame. For example, the deformations 154 may simulate the asymmetric look of a burning candle flame. The deformations 154 may also move, deform, or otherwise change shape in response to light, heat or other components. Although described as a polymer, any number of other light-sensitive or photo responsive materials, combinations, or compositions may be utilized (e.g., cloth, metal, plastic, wood, etc.).

In one embodiment, the top portion (e.g., flame simulation components, wick, etc.), bottom portion, or base of the electronic candles 100 may rotate to add to the effect or ambiance. For example, a miniature motor may slowly (or quickly) rotate the polymer wick 152 to better simulate a flame. The base may also be utilized to dock the electronic candles 100 in air or a liquid. The base may also include a larger battery or be powered for charging the electronic candles 100.

In one embodiment, the electronic candles 100 may include a base (not shown) including the battery 101 that may be swapped out or replaced. As a result, additional bases may be utilized to quickly prolong the usefulness the electronic candles 100 by sharing a first battery while the second battery is utilized for the electronic candle 100. In another embodiment, the base may include a valve for letting water in or out to control whether the electronic candles 100 floats, hovers, or sinks (and at what level). For example, air/gas, water or liquid levels outside the electronic candle 100 or within the electronic candle 100 that affect buoyancy may be controlled utilizing a miniaturized pump and valve in the base to cause the electronic candles 100 to float, sink, or otherwise control the submersion level. For example, the electronic candles 100 may be utilized in a fish tank, decoration, water tank, or so forth. The electronic candles 100 may be decorated or include a cover to look like natural components, such as volcanos, stars, moons, frogs, jellyfish, houses, or so forth. The electronic candles 100 may intake or expel liquids or gases to control buoyancy. For example, a miniature bladder may be utilized to control if or when the electronic candles 100 float utilizing variable levels of air/gas.

In one embodiment, the electronic candles 100 may be operated on tables, counters, desks, or other fixtures or furniture that include an inductive charger or contacts for powering the electronic candles 100. The contacts may be fixed or retractable/spring loaded for interfacing with a charging device (e.g., tray, base, etc.). For example, the contacts may include a positive contact and a negative contact for charging the rechargeable battery 101. As a result, the electronic candles 100 may be operated continuously or for significant periods of time that may not be supported by the battery 101.

In one embodiment, the battery 101 (or other power supply) may be powerful enough to charge a customer's phone or personal electronic device. For example, the electronic candles 100 may include a USB port for connecting any number of phone or tablet power adapters. In another embodiment, the electronic candles 100 may include an inductive charger that may be positioned on or proximate to a wireless device to perform inductive charging utilizing the battery 101.

In one embodiment, a portion of the electronic candles 100 and corresponding frame 112, 131, 151 may include a cover 134. The cover 134 may represent a decorative or aesthetically appealing base for the electronic candles 100. In one embodiment, the cover 134 represents specified colors, patterns, or decorations that may be manufactured in batches or produced based on the specific requirements of customers as an integrated portion of the frame 112, 131, 151. The cover 134 may also represent a wrap or sticker applied to one or more portions of the exterior surface of the electronic candles 100. The cover 134 may utilize adhesives, magnets, sleeves, spring/biased components, to be secured to the electronic candles 100. The cover 134 may be utilized to match the aesthetic, furniture, or ambience of the applicable environment or user preference. The cover 134 may represent default patterns produced by the manufacturer or customized patterns and colors that may be uploaded by individual users, groups, organizations, businesses, or other parties that utilize the electronic candles 100.

Figure 2:
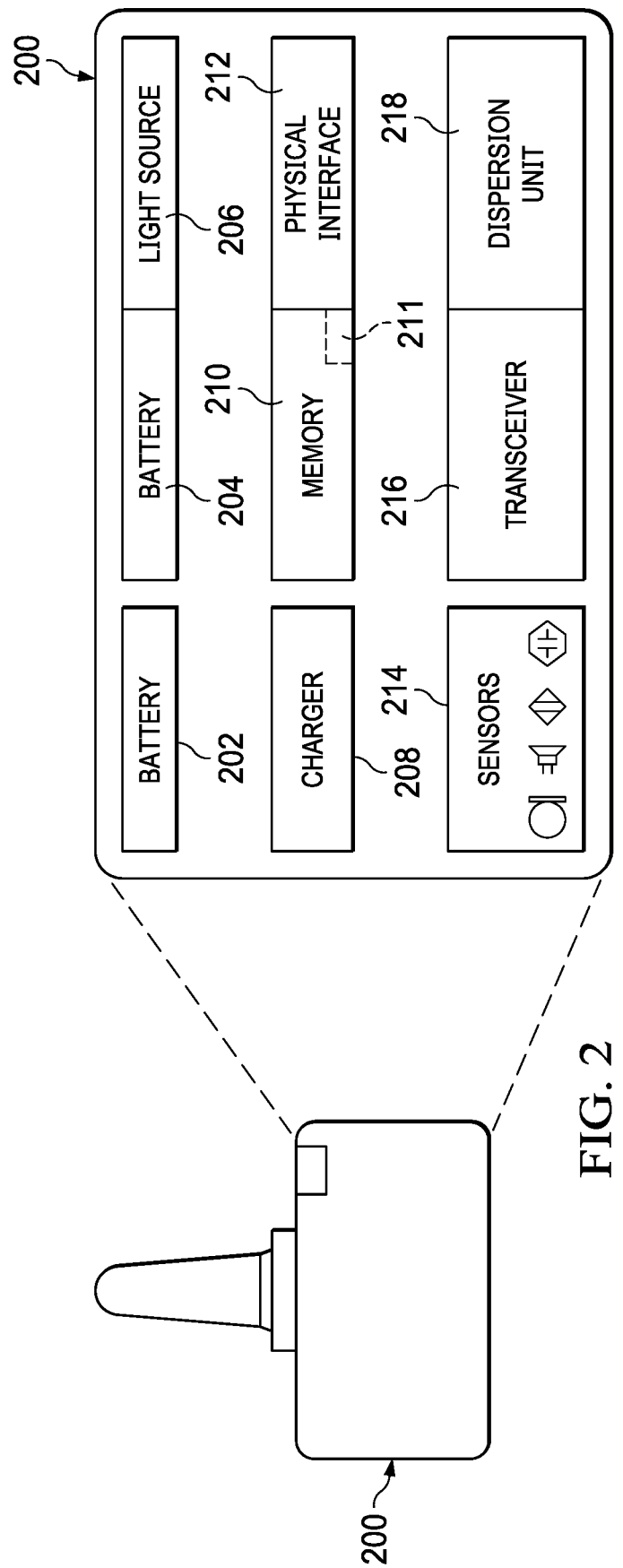
FIG. 2 is a block diagram of an electronic candle in accordance with an illustrative embodiment.

FIG. 2 is a block diagram of an electronic candle 200 in accordance with an illustrative embodiment. In one embodiment, the electronic candle 200 (or the base or frame) may include a battery 202, logic 204, light source(s) 206, charger 208, memory 210, settings 211, physical interface 212, sensors 214, transceiver 216, and dispersion unit 218. The electronic candle 200 may communicate with other electronic candles (of the same or different makes/models), a communications network, and wireless devices (e.g., cell phone, controller, etc.). In one embodiment, the electronic candle 200 may be represented by a single device. In other embodiments, the electronic candle 200 may represent a number of networked, interconnected, or communicating devices that communicate and function together to perform the processes and tasks herein described. In another embodiment, the charging rack, bases, or rows herein described may also include the components of the electronic candle 200.

For example, the electronic candle 200 may be configured to receive software, configurations, settings, and parameters with a storing device for implementation by the electronic candle 200.

In one embodiment, the various components of the electronic candle 200 may be hermetically sealed and/or waterproofed utilizing a sealed frame that prevents water from coming in or out. The components may also be chemically coated or sealed to prevent contamination.

The battery 202 is a power storage device configured to power the electronic candle 200. In other embodiments, the battery 202 may represent a fuel cell, thermal electric generator, signal capture device, piezo electric charger, solar units, thermal power generators, ultra-capacitor, or other existing or developing power generation and storage technologies. The logic 204 or the settings 211 preserve the capacity of the battery 408 by reducing unnecessary utilization of the flames candle 200 in a full-power mode when there is little or no benefit to the user (e.g., there is no one in the room, there is no noise, the room is entirely dark other than the electronic candle 200, etc.). In one embodiment, the battery 202 is automatically preserved by the logic 204, sensors 214, and other components of the electronic candle 200. In addition, the battery 202 may use just enough power for the transceiver 216 to communicate with another electronic candle, transceiver, charging row, charging base, or so forth.

In one embodiment, the battery 202 may be sufficiently large to completely or partially charge a number of wireless devices. For example, the sizes of the rechargeable batteries may vary between 2,000 mAh and 12,000 mAH with greater capacities also expected (e.g., 20,000 mAh). The rechargeable batteries may be regulated by a battery controller that communicates with one or more ports, such as USB, mini USB, micro USB, or other connection points. In one embodiment, the battery 202 may be removable for easily swapping out different batteries for the electronic candle 200 or electronic candle base/frame. In another embodiment, the electronic candle 200 may include a retractable cord (e.g., micro USB, lightning, etc.) for charging any number of devices (e.g., Samsung, Apple, OnePlus, Google, etc.). The cord may be temporarily or fixedly attached through one or more USB or other connections. The battery 202 may be provided as a complimentary or paid service for users of the electronic candles. This may be particularly beneficial for users that wish to be able to charge their personal electronic devices in various locations and conditions. For example, a couple that is eating dinner may also charge their smart phones for a night on the town utilizing power provided by the battery 202.

The logic 204 may represent hardware logic controlling the operations of the electronic candle 200. The logic 204 may include interconnected electronic components including chips/circuits whether analog or digital logic. In one embodiment, the logic 204 may represent a processor. The processor is circuitry or logic enabled to control execution of a set of instructions, application, operating system, kernel, modules, or program. The processor may be a microprocessor, digital signal processor, logic unit, application-specific integrated circuits (ASIC), field programmable gate arrays (FPGA), central processing unit (CPU), or other device suitable for controlling an electronic device including one or more hardware and software elements, executing software, instructions, programs, and applications, converting and processing signals and information, and performing other related tasks. The logic may be a single chip (e.g. ASIC, FPGA, microprocessor, etc.) or motherboard or may be integrated with other computing or communications components.

The logic 204 may also coordinate choreography and performance across the electronic candles 200 of the location, venue, event, or activity. For example, the light colors generated by the light source 206 of the electronic candles 200 may change colors simultaneously, sequentially, in a pattern (e.g., a wave, randomly, in a shape, exterior to interior, etc.), or in any number of ways that automatically determined or specified by a user. The logic 204 may control the brightness levels, color, flicker rate, and other performance of the electronic candles 200 such that the electronic candles 200 may become part of a show, environment, ambience, or so forth.

The light source 206 represents one or more light emitting diodes, organic light emitting diodes, polymer light emitting diodes, filaments, fluorescent lamps, arc lamps, lasers, bulbs, solid state lighting, or so forth. The light source 206 may represent one light source or multiple light sources. In one embodiment, the light source 206 may surround a wick component to simulate a flame. The light source 206 may also be associated with a lens, focuser, reflector, magnifier, or other optical or light-based component for directing the light. The light source 206 may communicate light directly or indirectly to simulate a flame. In one embodiment, a circular lens component may focus light from the light source 206 around the periphery of the wick. The light source 206 or portions of the light source may be turned off, varied in power, or otherwise increased or decreased to simulate a flicker rate. For example, the lights may be varied to simulate a flicker rate of approximately 5 Hz or five variations per second across all or portions of the light source 206.

The memory 210 is a hardware element, device, or recording media configured to store data for subsequent retrieval or access at a later time. The memory 210 may be static or dynamic memory 210. The memory 210 may include a solid-state drive, memory card, random access memory, cache, removable media drive, or other media suitable as storage for data, instructions, and information. In one embodiment, the memory 210 and the logic 204 may be integrated. The memory 210 may use any type of volatile or non-volatile storage techniques and mediums. The memory 210 may store user preferences, settings 211, parameters, thresholds, network information, and other applicable information and data.

In one embodiment, the memory 210 may store information retrieved by the sensors 214 (see for example FIG. 1). For example, the measurements may include information regarding light and noise levels. The memory 210 may also store settings 211. The settings 211 may be utilized to control the operation and functionality of the electronic candle 200. For example, the settings 211 may control the color emitted by the light source 206, the brightness of the light source 206, the flicker rate of the simulated flame, and other applicable information. Additional settings may include automatic turn/off times or time periods, Wi-Fi networks utilized, authorizations, communications, channels, protocols, passwords, and other applicable settings. The settings 211 may also store verbal commands that may be given by a user proximate the flameless candle 200.

The electronic candle 200 may include any number of computing and telecommunications components not specifically described herein for purposes of simplicity, such components, devices, or units may include busses, motherboards, circuits, ports, interfaces, cards, converters, adapters, connections, transceivers, displays, antennas, and so forth. The settings 211 may also control registering and authenticating flames candles for synchronization of content, settings, and communications. The settings 211 may also include one or more names for a network managed, accessed, distributed, or utilized, by the electronic candle 200. For example, the electronic candle 200 may communicate with a router, hub, or wireless device that communicates utilizing one or more Wi-Fi names. In one embodiment, the settings 211 may store a number of different user profiles associated with a number of administrators or users or the electronic candle 200. The settings 211 may store hardware identifiers, software identifiers, nicknames, contact lists, or other access information for different electronic candles or users.

The physical interface 212 is the selection components configured to receive physical input, feedback, selections, commands, or instructions from the user or other devices. The physical interface 212 may include is the buttons, switches, selectors, scroll wheels, touch/interfaces, screens, or other components for receiving and outputting information to a user. In one embodiment, the physical interface 212 may include an on/off switch, a color dial, and a flicker rate dial for physical adjusting the power status, color of the flame, and flicker rate. The physical interface 212 may also include a user interface for receiving applicable information and selections. For example, the physical interface 212 may be utilized to receive information when a client is ready to make an order, provide payment, ask a question, express a need, indicate a problem/emergency, or provide additional information. In another embodiment, the physical interface 212 may include a transactional interface for receiving automatic payments for food, services, tips, or so forth. The physical interface 212 may also be hermetically sealed allowing physical connections and selections without letting water or other contaminants within the body of the electronic candle 200. The physical interface 212 may include an indicator that shows the battery status or other performance information for the electronic candle 200. In one embodiment, a button, switch, or other component is activated to indicate the battery status or other performance metrics of the electronic candle 200. The battery status indicator may then be turned off to help maintain the ambience provided by the electronic candle 200.

In one embodiment, the physical interface 212 may also include a port, receptacle, or reader for interfacing with payment devices, such as credit cards, smart cards, debit cards, gift cards, payment chips, bracelets, smart phones, or so forth. For example, the electronic candle 200 may accept payments for goods or services rendered for users proximate that electronic candle 200/table/location. For example, the physical interface 212 may accept payments using a magnetic reader, near field communications chips, EMV, or other applicable standards (e.g., RFID, Google Pay, Apple Pay, Samsung POA, standards based on ISO/IEC 7816 for contact cards, and standards based on ISO/IEC 14443 for contactless cards).

Although not shown, the electronic candle 200 may include a camera or other image capture device(s). The images may include still and video images that may be retrieved and stored in the memory 210 or communicated directly to one or more other users. In one embodiment, the camera may be integrated with the electronic candle 200. In another embodiment, the camera may be externally linked utilizing any number of wireless or wired connections, such as a high definition media interface (HDMI), USB, Bluetooth, or Wi-Fi connections. For example, the electronic candle 200 may be inserted in a base that may capture images for security purposes. The camera may capture content in a week loop to preserve the memory 210 (e.g., 128 Gb SSD card). The camera may also capture content in response to one or more conditions, such as noise level, time of day, verbal commands, and so forth.

The transceiver 216 is a component comprising both a transmitter and receiver which may be combined and share common circuitry on a single housing. The transceiver 216 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.) or other suitable radio frequency standards, networks, protocols, or communications. The transceiver 216 may include a number of different transceivers configured to utilize distinct communications protocols and standards. For example, the transceiver 216 may be a hybrid transceiver that supports a number of different communications. For example, the transceiver 216 may communicate utilizing Ethernet, powerline networking, Wi-Fi, Bluetooth, and cellular signals.

The transceiver 216 may be configured to receive commands, input, and instructions from any number of devices including, but not limited to, commercial controllers, smart controllers (e.g., Amazon Alexa, Apple Ski, Google, Cortana, etc.), wireless devices, and so forth. For example, instructions provided to Amazon Alexa may enable an "Amazing Flameless Candle Feature" to control the electronic candles 200 individually or as a group. For example, a user may give voice commands to "change flam color to yellow", "set light intensity to seven", "increase flicker rate to thirty hertz", "set group 3 to flame color blue", or any number of other controls. Any number of mobile or application program interfaces may be utilized to control the electronic candle 200.

In one embodiment, the transceiver 216 may be utilized as a Wi-Fi extender, payment processing device, router, booster, or repeater. As a result, the electronic candle 200 may be utilized to extend a Wi-Fi network for a venue, event, or location. In some embodiments, different electronic candles may be utilized to extend different networks that may have different users or purposes. The transceiver 216 may also be utilized to generate a mesh network of electronic candles. The mesh network may be utilized for commands, updates, instructions, or messages between the electronic candles or for connecting devices, such as cell phones, tablets, laptops, or so forth utilized by clients or workers associated with a location, event, venue, or so forth.

The electronic candle 200 may be controlled individually, as groups, or as an entire set. In one example, a mobile application executed by a cell phone in communication with the electronic candles 200 may display a map of the available electronic candles based on placement information (e.g., integrated GPS, beacon, etc.), real-time mapping, wireless triangulation, or other available information to control the electronic candle 200 individually, as a group, or as an entire set.

The electronic candle 200 may also include electronic candle hardware and software (not shown, representing the additional hardware and software components and units) that allow the electronic candle 200 to function and interact. Although described with regard to the electronic candle 200, all or a portion of the electronic candle 200 may be applicable to a candle base (not shown). In one embodiment, the electronic candle 200 may be a dumb device that is controlled entirely by the candle base including all or portions of the logical components.

As previously noted, the electronic candle 200 may be hermetically sealed and waterproof and enclosed in a case, frame, cover, or exterior. Even the electrical components are hermetically sealed to allow the electronic candle 200 to be rinsed, washed off, or submerged. The waterproof and hermetically sealed nature of the electronic candle 200 provides a differentiator among groups of electronic candles. In one embodiment, junctions and electrical components may be chemically and mechanically sealed to provide the waterproof properties of the electronic candle 200.

Figure 3:
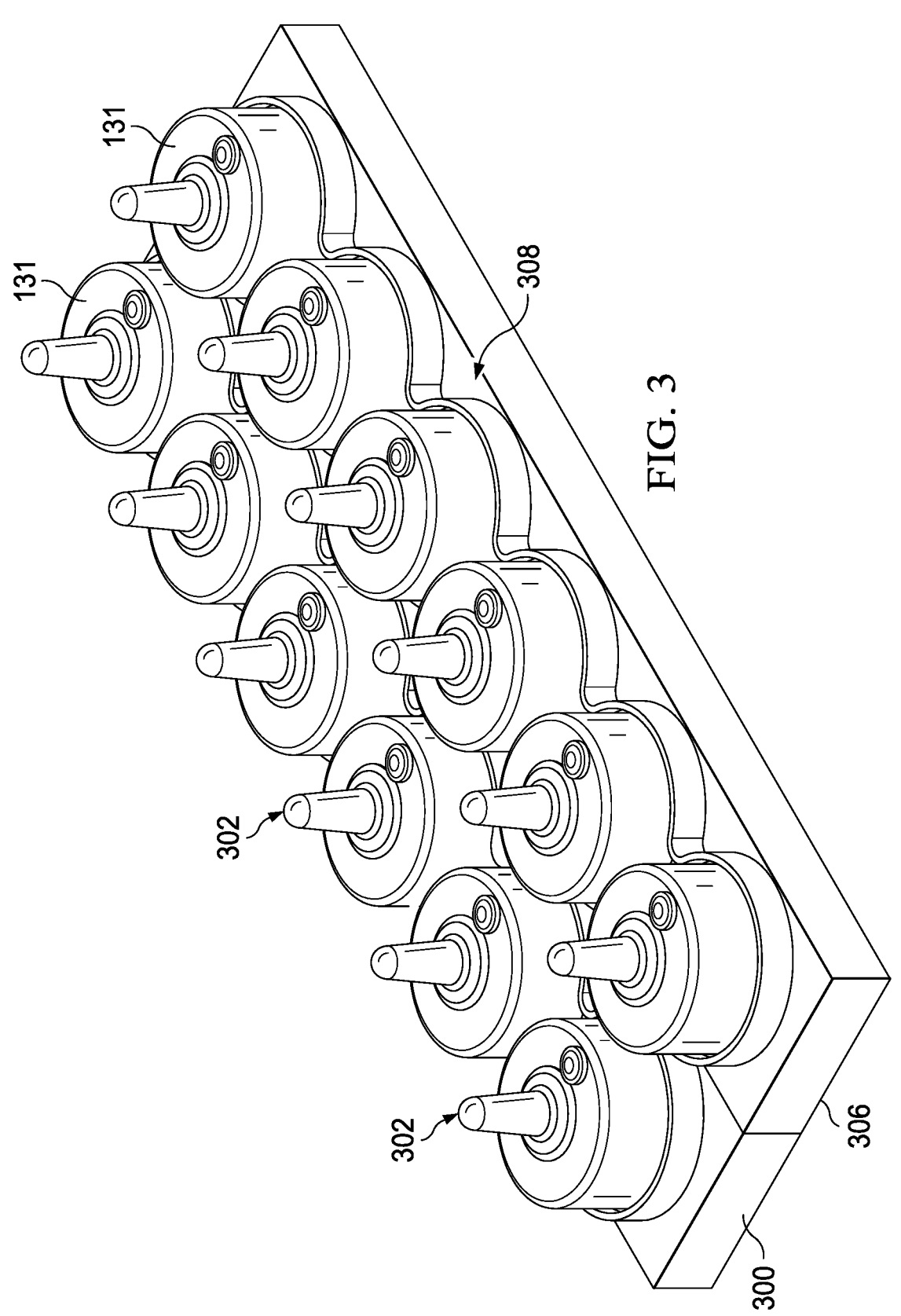
FIGS. 3 and 4 are a pictorial representation of a charging row and electronic candles in accordance with an illustrative embodiment.
Figure 4:
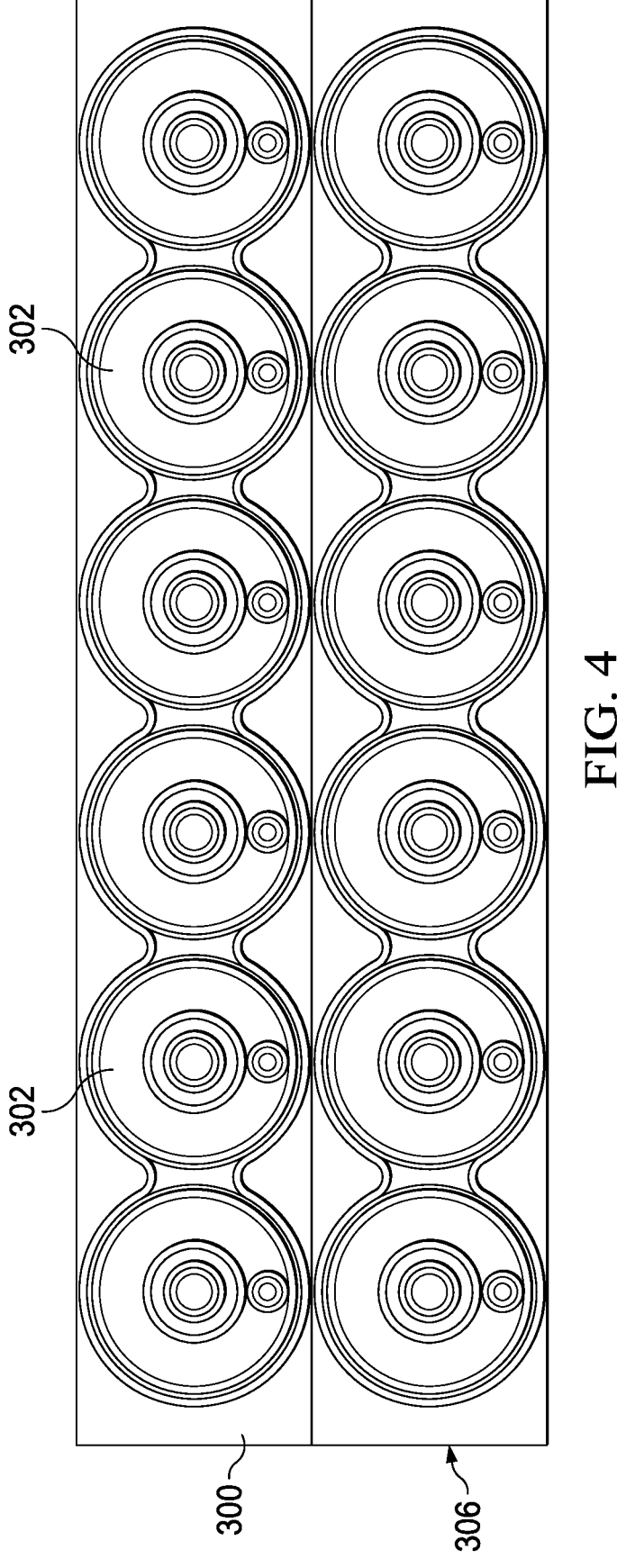

FIGS. 3 and 4 are a pictorial representation of a charging row 300 and electronic candles 302 in accordance with an illustrative embodiment. The charging row 300 may also be referred to as a row or interface and may be integrated with others bases or components for securely storing and charging the electronic candles 302. The electronic candles 302 represent any of the electronic candles 302 of FIGS. 1 and 2. In one embodiment, the charging row 300 may include multiple ports 304 for receiving the electronic candles 302. The ports 304 may also be referred to as receptacles. The ports 304 may correspond to the size and shape of the electronic candles 302. The ports 304 may represent indentations, receptacles, or interfaces in a frame 306 of the charging row 300. In another embodiment, the ports 304 may represent a rounded circle indentation for receiving electronic candles of any number of sizes and shapes.

The ports 304 also include securing mechanisms 310. The securing mechanisms 310 may secure or lock the electronic candles 300 in place for movement (placement and retrieval), charging, and/or storage. In one embodiment, the securing mechanism 310 may be integrated with the port 304 with receptacles and a frame 131 for receiving the electronic candles 300. For example, the electronic candles 300 may include tabs, ridges, extensions, or structures that interlock with the structure of the ports 304 to be physically secured. In another embodiment, the securing mechanisms 310 may include tabs, ridges, extensions, or structures that secure the electronic candles 302 in place. For example, the electronic candles 302 may be placed in the ports 304 and then rotated slightly (e.g., clockwise) to lock the electronic candles 302. The electronic candles 302 may include receptacles for receiving the tabs of the charging row 300. In another embodiment, the ports 304 may include a magnet for securing a metal plate, tag, or frame integrated with or attached to a bottom portion of the electronic candles 300. The securing mechanisms 310 secure the electronic candles 302 so that the charging row 300 may be stored horizontally, vertically, or even up-side-down. Similarly, the charging row 300 may be moved in various positions without the electronic candles 302 coming loose.

The securing mechanisms 310 may also include magnets that interface with the ports 304 to lock each of the electronic candles 302 in place, grippers, an interference fit (e.g., bumpers, narrowing cylinders, gripping materials, etc.), locking arms or plates, or other known locking mechanisms. The ports 304 and electronic candles 300 may also include indicators to show how to position the electronic candles 300 within the ports 304 (and securing mechanism 310) to properly lock/secure the electronic candles 300 in place (e.g., for movement, charging, storage, updating, etc.). The indicators may include markings, indentations, tabs, lights, or other features that may be easily viewed or felt by a user physically handling the electronic candles 302. For example, the indicators may include logos, emblems, tags, stickers, small indentations, lines, particular decorations, or so forth. The indicators may be an integrated portion of the electronic candles 302 or may be added as needed.

The charging row 300 may include interfaces for electrically connecting to the electronic candles 300 to charge the electronic candles 300. The interfaces (not shown) may include contacts, spring connectors, pads, or so forth for charging the electronic candles 300 and performing data communications as allowed. The ports 304 may be configured to automatically align the interfaces of the charging row 300 with the contacts of the electronic candles 300.

In one embodiment, the charging row 300 includes one or more inductive chargers 308. The inductive chargers 308 may be utilized to charge one or more of the electronic candles 302 at a time. For example, the inductive chargers 308 may correspond with the ports 304 to charge individual electronic candles 302. In another example, the inductive chargers 308 may represent a single inductive charger positioned within the frame 306 and sufficient to charge all of the electronic candles 302 at once.

The charging row 300 may include one or more indicators 310 for indicating the charging status of the electronic candles 302. In one embodiment, the indicators 310 may be associated with the ports 304 for indicating the status of each of the electronic candles 302. The indicators 310 may utilize any number of colors, dotes, bars, circles, or symbols to indicate the charging status of the electronic candles 302. The indicators 310 may be on the sides of the charging row 300 proximate the electronic candles 302. In another embodiment, the indicators 310 may encompass the electronic candles 302. For example, green may indicate that the battery of the electronic candle is charged, orange may indicate that the battery of the electronic candle 302 is partially charged, and red may indicate that the battery of the electronic candle 302 is completely dead. In another example, a circle proximate each of the flameless candles 302 may represent charge held by illuminating the portion of the circle associated with the charge level. For example, for a flameless candle that is 75% charged, the circle indicator may show ¾ in green (or alternatively ¾ in green and ¼ in red) to indicate the charge status. The light source of the flameless candles 302 or an external indicator that is part of the flameless candles 302 may also indicate the charge level. For example, when charging whatever color utilized may flash and a red light or glow may indicate a very low battery, orange may indicate a middle level, and green may indicate fully charged. For example, the light may become a solid green when fully charged. The charge indicators may be turned off when the flameless candles 302 are not in use.

The charging row 300 may be connected to any number of power sources, such as an alternating current plug. The charging row 300 may include any number of transformers, power adapters, or other power components or they may be externally connected. In another embodiment, the charging row 300 may include a battery (not shown) for charging the flameless candles 302 even when an external power source is unavailable. As a result, the charging row 300 may charge the flameless candles 302 any number of times before the charging row 300 has to be recharged itself. The charging row 300 may also include solar cells integrated in the exterior of the frame 306, fuel cells, ultracapacitors, or other power sources.

The charging row 300 may be water resistant, waterproof, or hermetically sealed for flameless candles 302 that may be utilized in water or other liquids before being placed on the charging row 300. In other embodiments, the charging row 300 may include a lid (not shown) for covering the flameless candles 302 during the charging process.

Figure 5:
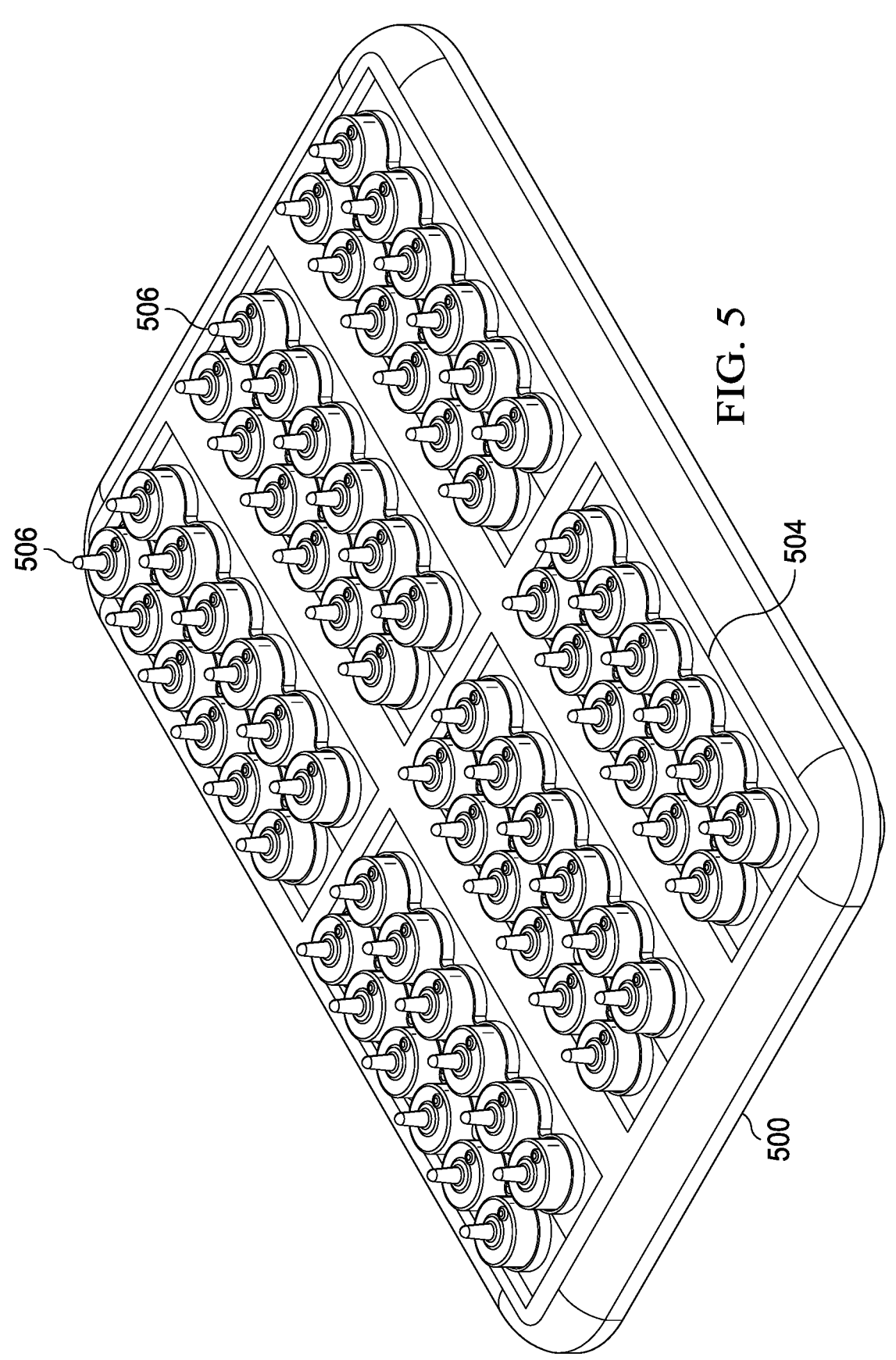
FIG. 5 is a pictorial representation of a charging base in accordance with an illustrative embodiment.

FIG. 5 is a pictorial representation of another charging base 500 in accordance with an illustrative embodiment. The charging base 500 is coming configured to receive multiple flameless candles 502. In one embodiment, the charging base 500 may represent a single larger tray with multiple receptacles 504 for electronic candles 506. For example, the charging base 500 may represent a single structure with multiple receptacles 504 for charging the electronic candles 506. The receptacles 504 are subsequently described in more detail. The receptacles 504 may include physical connectors or magnetic connectors for securing the electronic candles 506 while being moved or transported and contacts/chargers for charging the electronic candles 506 when positioned within the charging base 500. As a result, the charging base 500 may be carried horizontally, vertically, or at any angle. The charging base 500 may also be inserted or connected to a larger system, such as rack charging system as is shown in other embodiments. For example, the charging base 500 may include contacts for powering the charging base 500 and all integrated receptacles 504 from an external source (e.g., wires, transformers, etc.). The charging base 500 may also include any number of tabs, interfaces, receptacles, or connectors for connection to a larger or more extended system.

In another embodiment, the charging base 500 represents multiple interconnected charging rows 508. For example, any number of charging rows 508 may be attached to or mounted in the charging base 500. The charging base 500 may be sized or customized for the individual needs.

The charging rows 508 bases may be interconnected utilizing any number of electrical, mechanical, or electro-mechanical connectors or fasteners, such as locking tabs, spring-loaded contacts, male/female plugs and receptacles, structural interconnects, magnets, and so forth. As a result, the size and configuration of the charging bases 500 may be adjusted to the location, flameless candle requirements, and so forth. For example, multiple charging bases may be physically and electrically connected for sharing a common power connection. The power connection may include a common DC connection, an AC connection, a power port, power pins, or other interface for connecting to a powered shelf, rack, or outlet.

As noted, the charging base 500 may be configured in any number of sizes and shapes. The charging base 500 may include all of the components of the charging row 300 of FIGS. 3 and 4. In one embodiment, the charging base 500 may include a handle (not shown). The handle may be integrated into a main body of the charging base. The handle may also extend diagonally, vertically, or horizontally from the body of the charging base. The handle ensures that the flameless candles may be easily placed throughout a location (e.g., removed) or picked up and placed on the charging base 500. In one example, the handle includes an opening at one or more ends of the charging base 500 that allows all or a portion of the user's hand to be placed on or through the handle. For example, a user may balance the charging base on their forearm with a grip with their palm facing up to position and retrieve flameless candles. The grip may also be removable.

The charging base 500 may also include a number of holes or receptacles for storing, mounting, or hanging the charging base 500 vertically, horizontally, or at an angle. For example, the location may have limited space for storing one or more charging bases 500. As a result, the charging base 500 may be stored or mounted (temporarily or permanently) on a wall hook, nail, peg, or so forth in a vertical storage configuration. The charging base 500 may also be utilized in cruise ships, food trucks, or other areas or locations that require the charging base 500 be securely stored or mounted for safety, preservation of the electronic candles, and protection. The charging base 500 may also include any number of brackets or wall hangers that facilitate hanging or otherwise positioning the charging base 500.

Figure 6:
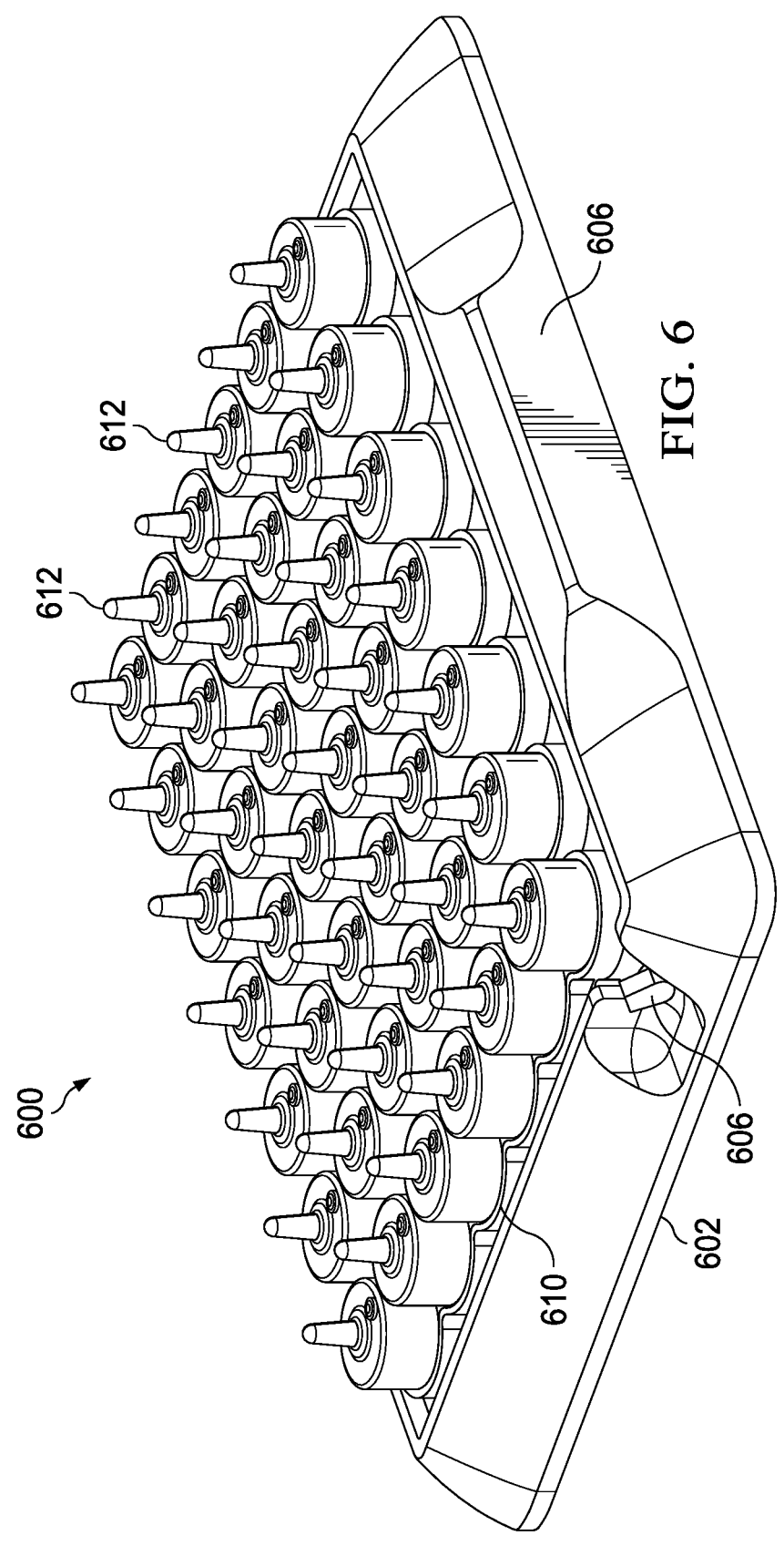
FIG. 6 is a pictorial representation of another charging base in accordance with an illustrative embodiment.

FIG. 6 is a pictorial representation of a charging base 600 in accordance with an illustrative embodiment. The charging base 600 may represent a single integrated component or multiple components that may be integrated to form the charging base 600. The charging base 600 may include frame 602, handle 604, charging port 606, charging rows 608, receptacles 610, and electronic candles 612.

The frame 602 of the charging base 600 is ergonomically shaped. For example, the sides and edges of the frame 602 may be rounded to prevent scratching people, furniture, or objects. In one embodiment, a bottom portion of the frame 602 may include non-marking stoppers or legs to prevent the charging base 600 from scratching tables, shelves, counters, or other items if set or placed there. The charging base 600 may alternatively include wheels, casters, slides, or rollers for moving or sliding the charging base 600 small distances. The frame 602 may represent a single molded structure with integrated electronics. The frame 602 may also include one or more components (e.g., mounting plate, base, trays, etc.) that may be secured together to provide a structural and physical framework for the charging base 600. The frame 602 may include any number of vertical and horizontal supports, panels, or extensions.

The charging base 600 (and more particularly the frame 602) may also define a number of pass throughs or mounting holes (not shown) for securing the charging base 600 to a wall, table, desk, or other surface of a building, structure, furniture, fixtures, or so forth. For example, the charging base 600 may be attached to a specified surface or object utilizing screws, bolts, mounting plates, adhesives, brackets, hangers, or so forth.

The handle 604 represents one or more handholds defined within the frame 602. The handle 604 may be included on one, two, or all sides of the frame 602. The handle 604 may define an opening for the user's fingers to hold the charging base 600. In another embodiment, the handle 604 may define a U-shaped handle, pull, center bar pull, retractable, hinged, D-handle, or other type of handle that may be molded into the frame 602 or separately attached. For example, the handle 604 may extend vertically from the plane of the charging base 602. The handle 604 may also include openings such that the fingers/hand of a user may be complete wrapped around the handle 604. The handle 604 may also represent straps or other gripping components. The handle 604 may allow the charging base 600 to be carried horizontally, vertically, or at any angle.

The charging port 606 is the interface for powering the charging base 600 to charge the rechargeable batteries of the electronic candles. The charging port 606 may represent any number of connectors. For example, the charging port 606 may be a DC power connector that interfaces with a jack (not shown) to power the charging base 600. In another embodiment, the charging port 606 may also represent connectors that may electrically interface with charging components (e.g., pins, connectors, springs, etc.) of a rack on which the charging base 600 may be stored for charging the electronic candles 612.

Figure 7:
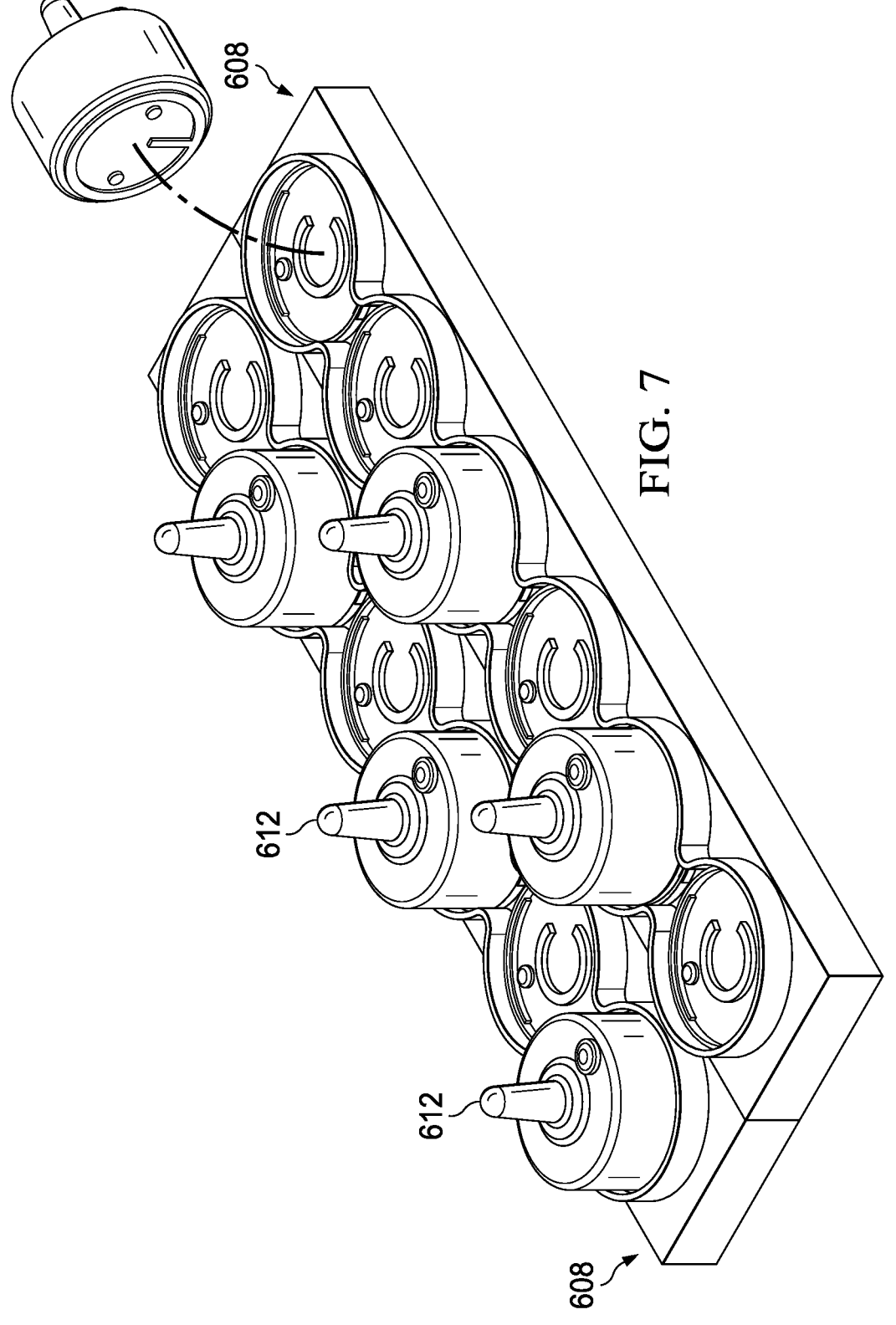
FIG. 7 is a pictorial representation of a charging row in accordance with an illustrative embodiment.

FIG. 7 is a pictorial representation of charging rows 608 of FIG. 6 in accordance with an illustrative embodiment. Two charging rows 608 are shown interconnected in FIG. 7. The charging rows 608 may be interconnected to form a larger charging base. In other examples, multiple charging bases may be physically and electrically interconnected. The charging rows 608 are shown partially filled with electronic candles 612. The charging rows 608 define the receptacles 610. The receptacles 610 provide a structure for storing the electronic candles 612. The receptacles 610 include contacts 622 for electrically connecting to contacts 632 of the electronic candles 612. In one embodiment, the contacts 622 are rounded spring-loaded pins. The contacts 622 electrically connect the charging rows 608 to the electronic candles 612 as well as secure the electronic candles 612 in place utilizing a force applied through the spring-loaded or biased contacts 622.

In one embodiment, the receptacles 610 define a locking ring 624. The locking ring 624 is configured to interact with tabs 630 or extensions on the electronic candles 612. The locking ring 624 may include openings 626. The openings correspond to the size and shape of the tabs 630. In one embodiment, the openings 626 are different sized as are the tabs 630 so that the positive and negative contacts 622 and 632 may only be connected in the correct configuration (e.g., no cross or negative connections). To secure the electronic candles 612, the tabs of the electronic candles 612 are aligned with the openings 626, the electronic candles are pushed down against the contacts 622 and the electronic candles are rotated clockwise to lock the electronic candles in place with the tabs secured below the locking rings 624. To release the electronic candles 612, the electronic candles 612 are rotated counterclockwise until the tabs 630 align with the openings 626 allowing the electronic candles 612 to be lifted from the receptacles 610. For example, the locking rings 624 may allow the electronic candles 612 to rotate a $\frac{1}{16}$-$\frac{1}{8}$ turn once the tabs 630 pass through the openings 626 and the tabs 630 are rotated below the locking rings 624.

When the charging rows 608 are properly powered, the electronic candles 612 may display a light, color, or other indicator showing that they are charging. The electronic candles 612 may also indicate when charged or there is an improper connection, contacts 622, or other portions of the receptacles 610. For example, the electronic candles 612 may display a green light when charging.

Figure 8:
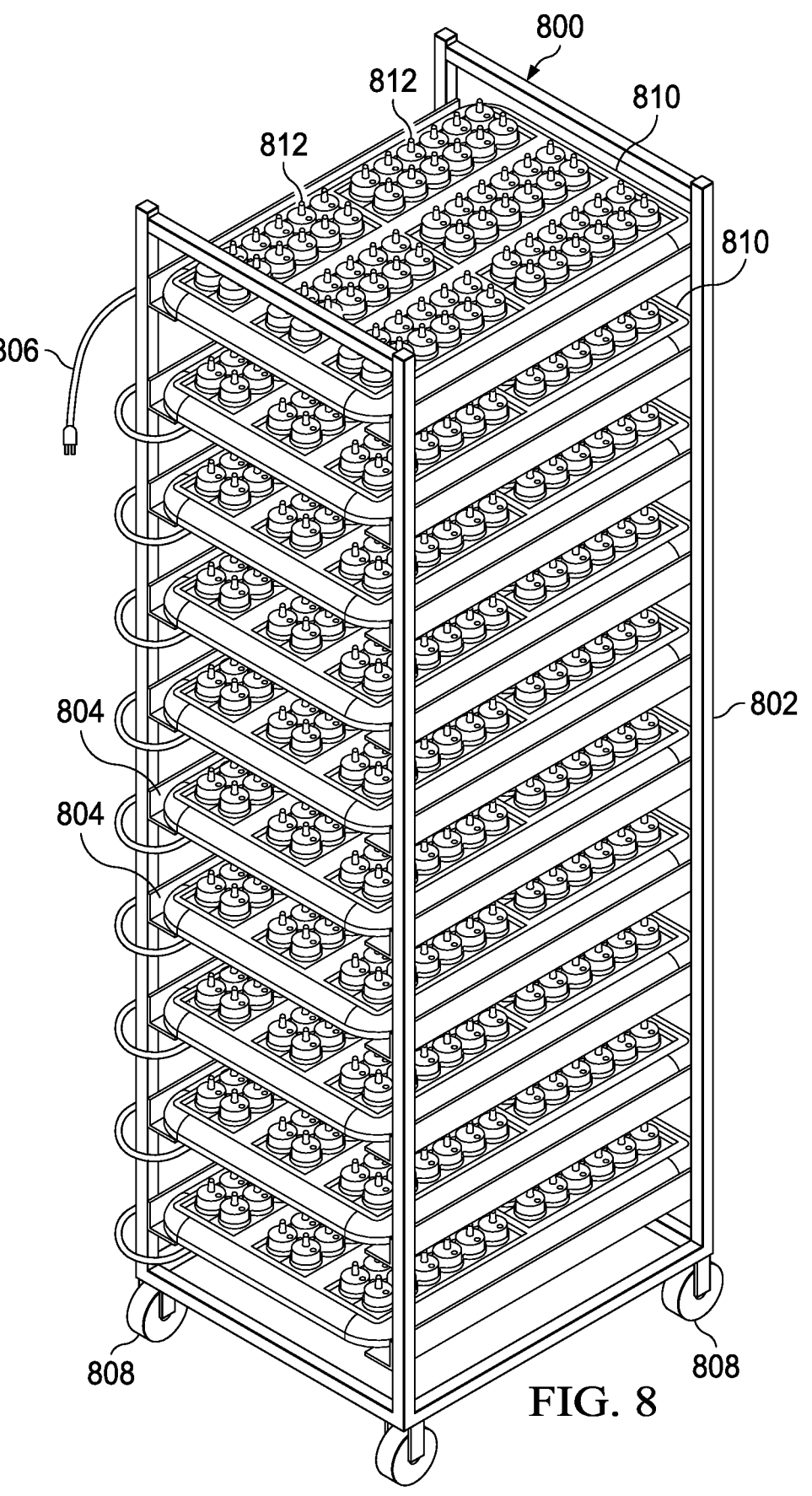
FIG. 8 is a pictorial representation of a charging rack in accordance with an illustrative embodiment.

FIG. 8 is a pictorial representation of a charging rack 800 in accordance with an illustrative embodiment. The charging rack 800 may include a frame 802, shelves 804, power connection 806, and wheels 808. The frame 802 is the structural supports for the charging rack 800. The frame 802 may represent metal, plastic, polymers, a combination thereof, or other materials. For example, the frame 802 may be formed of aluminum, steel, composites, or plastic suited to bear the load (e.g., hollow aluminum tubing—rectangular or rounded, bars, flat pieces, etc.). In one embodiment, the frame 802 is a rectangular structure with the greater length extending vertically for limiting the footprint of the charging rack (e.g., banquet halls, restaurants, cruise ships, etc.). For example, the frame 802 may be formed of vertical and horizontal supports. The frame 802 may be the outermost portion of the charging rack 800 that is further supported by the shelves 804. The shelves may extend all the way between the frame 802. The charging rack 800 may represent a custom-built rack or alternatively a retrofitted catering or entertaining rack including all of the features therein.

The shelves 804 may be permanently or temporarily connect to the frame 802. For example, the shelves 804 may be welded, inserted, adhered, connected or otherwise connected to the frame 802. The shelves 804 may represent rails or extensions from the frame 802. For example, the shelves 804 may extend inward from the frame 802 1-3 inches. For example, such extensions of the shelves 804 may be alternatively referred to as rails. In another example, the shelves 804 may extend all the way between the sides of the frame 802 to provide additional support. In one embodiment, bases 810 are positioned on the shelves 804. The bases 810 may represent those shown in FIG. 3, 4, or 5. The bases 810 may include an interface for electrically connecting to the power system of the charging rack 800. For example, a power interface (not shown) may interconnect the bases 810 with the charging rack 800. Any number of ports, pins, extensions, contacts, extensions, inductive chargers, or other hardware may be integrated with the bottom or sides of the bases 810 to receive power and/or data from the charging rack. For example, contacts on the shelves/rails 804 may charge the bases 810 when set on or docked with the shelves 804 at any point or at designated locations (e.g., stops, markers, indicators, tabs, ports or other components may be utilized for alignment/docking). The power system of the charging rack 800 may also be utilized for wired communications. Alternatively, wireless communications may be performed with the flameless candles. For example, the charging rack 800 may include a wireless hub, router, range extender, or so forth. Short range communications, such as Wi-Fi, Bluetooth, RFID, infrared, or other signals, communications, protocols, or standards, may be utilized to communicate settings, software updates, or other applicable information to the flameless candles.

The power connection 806 may represent wires, traces, connectors, interfaces, amplifiers, transformers, and other components for powering the charging rack 806. The power connection 806 may also represent the power and/or communications capabilities of the charging rack 800. In one embodiment, the wiring for the power connection 806 may be within the frame 802. The power connection 806 may include one or more plugs for powering the charging rack 800 from a standard wall outlet. The power connection 806 may also allow multiple charging racks to be connected (e.g., serially, daisy chain, etc.).

In one embodiment, the charging rack 800 may include a user interface for configuring flameless candles 812 that are on or within the charging rack 800. The user interface may allow a user to locally or remotely program the individual flameless candles 812, charging bases full of flameless candles 812, shelves 804 of the charging rack 800, or all of the flameless candles 812 on the charging rack 800. For example, the color, brightness, flicker rate, auto-turn on/off configuration, and other settings may be established. The user interface may include buttons, switches, dials, or other indicators for settings, such as color, intensity, flicker rate, and so forth. In one embodiment, the charging rack 800 may communicate updates to the flameless candles 812 wherever they are (e.g., on the rack, distributed, etc.).

Figure 9:
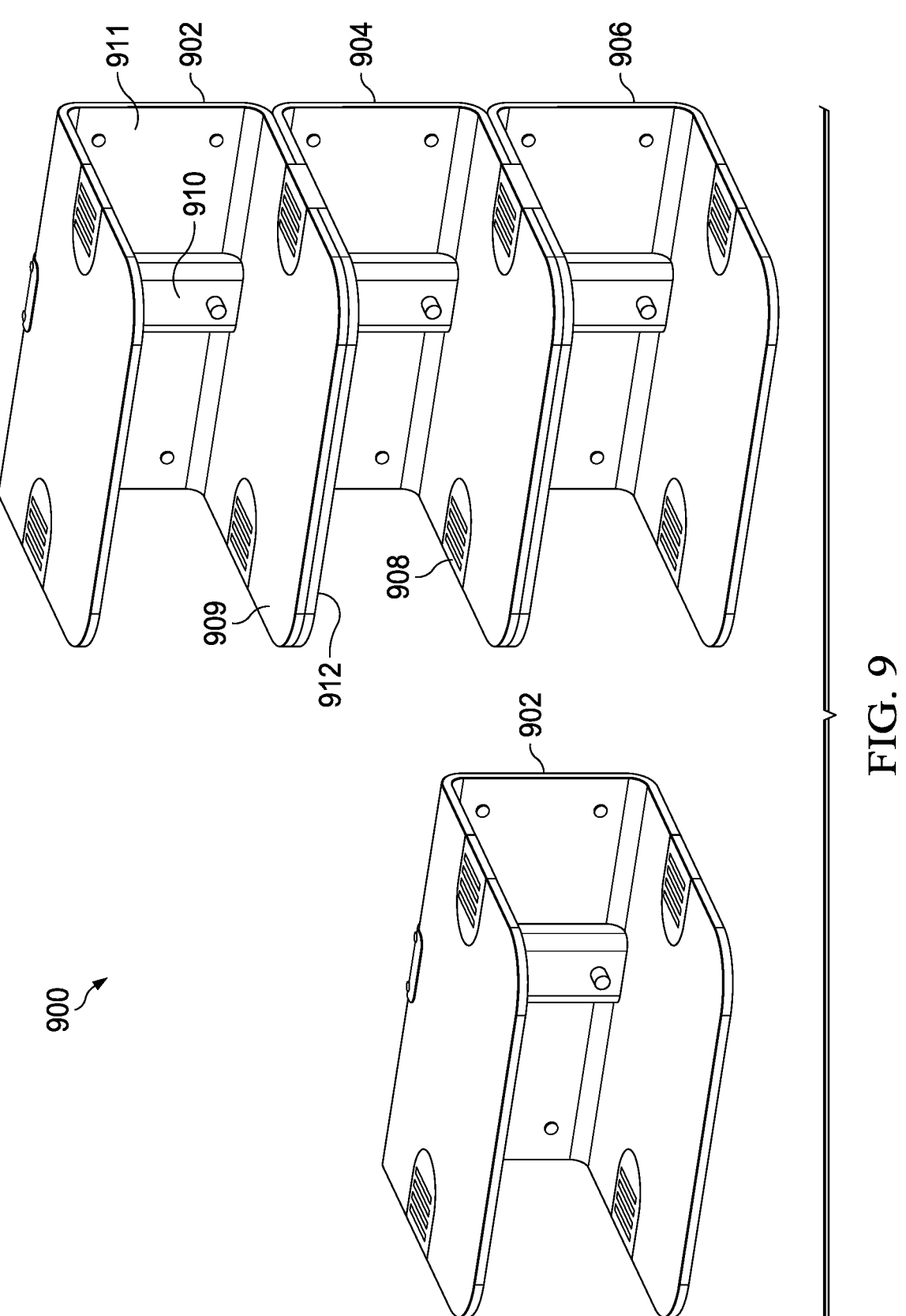
FIGS. 9, 10A, 10B, 11A, 11B, and 11C are pictorial representations of charging shelves in accordance with an illustrative embodiment.
Figure 10A:
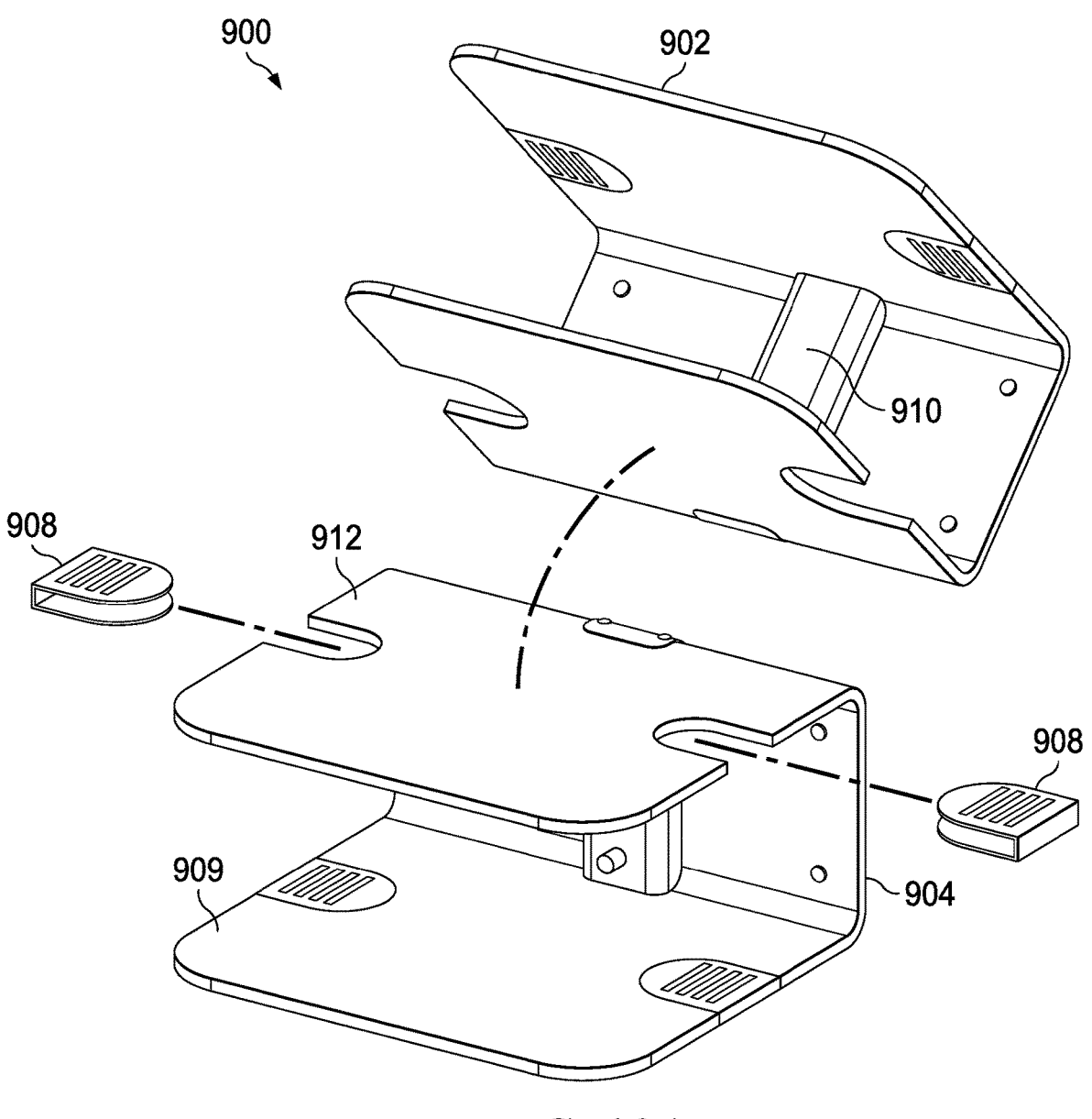
Figure 10B:
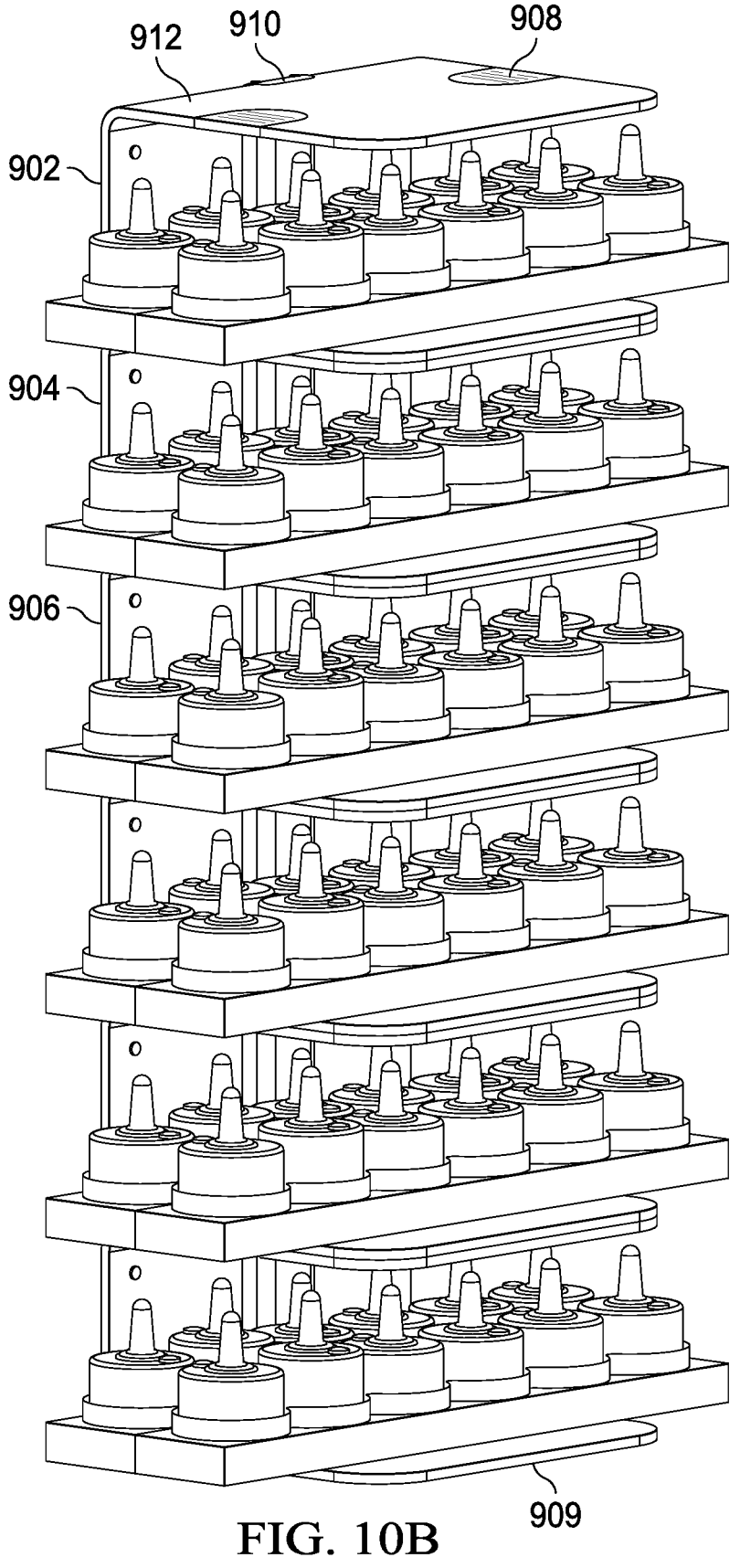
Figure 11B:
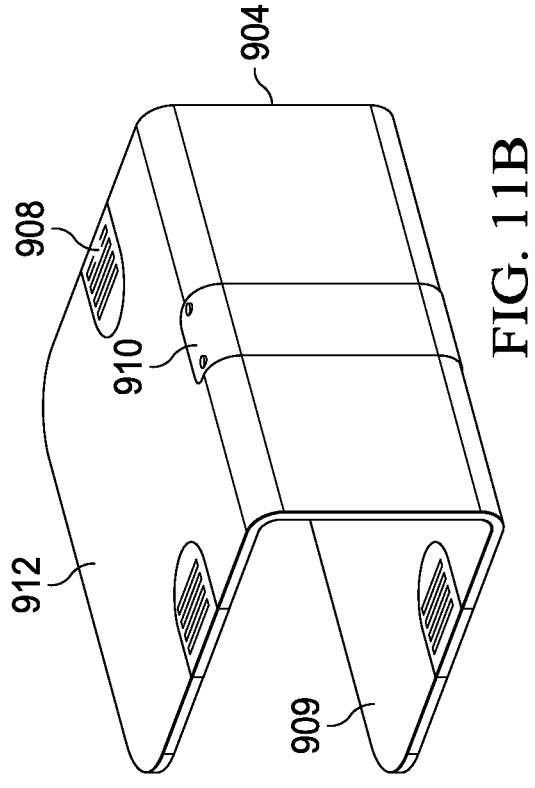
Figure 11A:
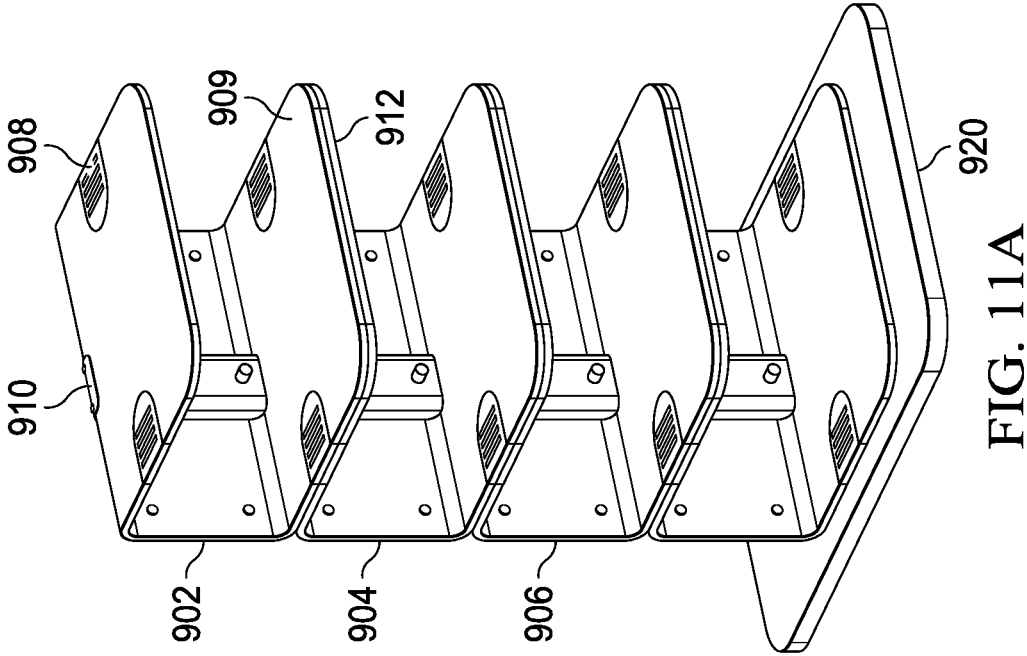
Figure 11C:
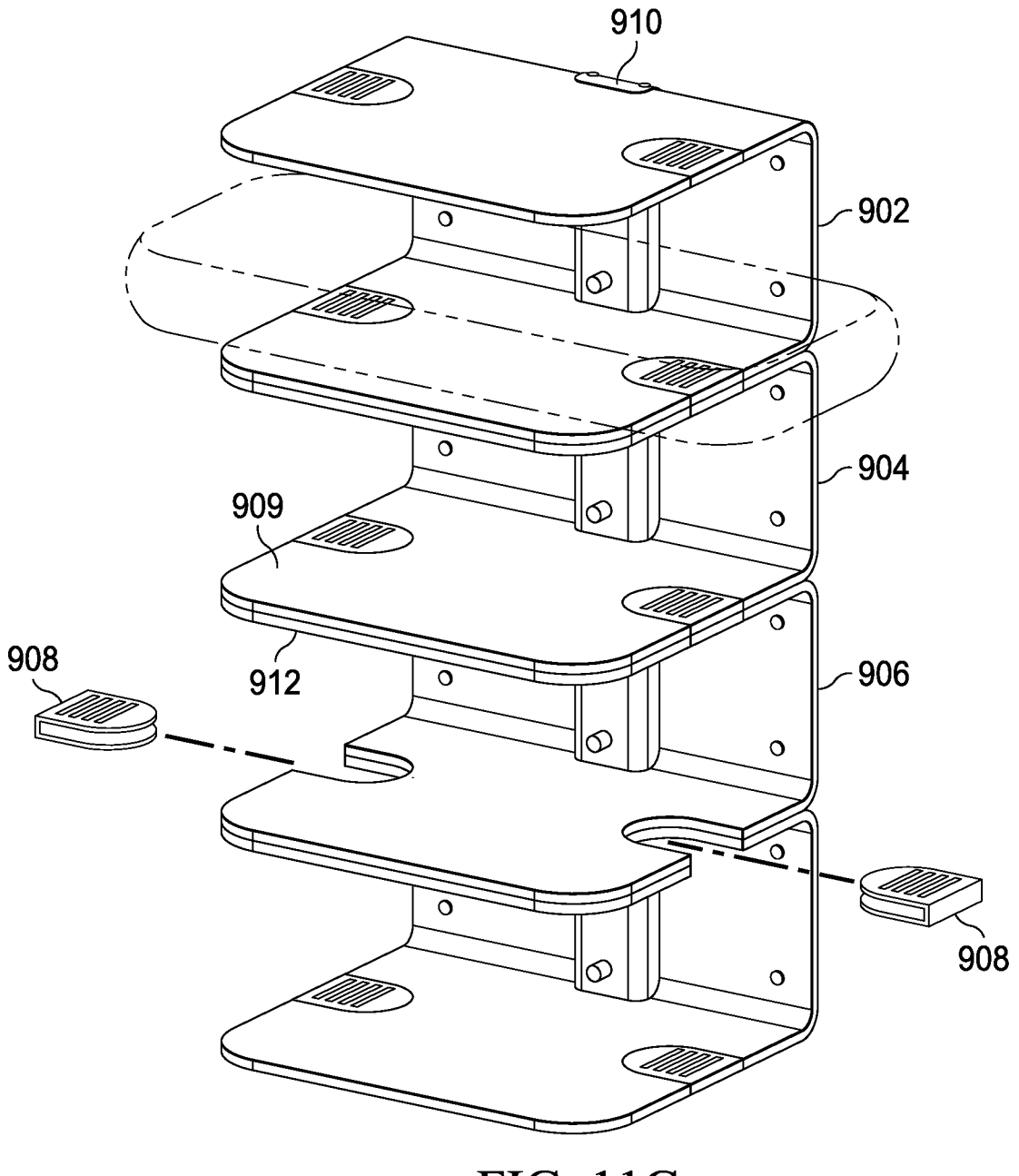

FIGS. 9-11 are pictorial representations of charging shelves 900 in accordance with an illustrative embodiment. In one embodiment, the charging shelves 900 are configured of shelves 902, 904, 906 that are interconnected utilizing fasteners 908 and connectors 910. As shown in FIG. 9 three different shelves 902, 904, 906 are interconnected to form the charging shelves 900. However, in any number of embodiments any number of shelves may be interconnected (e.g., one to twenty-five or more). The shelves 902, 904, 906 may be utilized alone or as the charging shelves 900.

The fasteners 908 provide a mechanical connection between a bottom panel 909 of one shelf and a top panel 912 of another shelf. In one embodiment, the fasteners 908 are C-shaped tabs that secure a bottom panel 909 to a top panel 912. The fasteners 908 may also represent connection plates, clamps, screws, bolts/nuts, Velcro, pins, or so forth. The fasteners 908 may represent dovetail clips that may be inserted into pre-configured grooves of the bottom panel 909 and top panel 912.

The connectors 910 provide an electrical and/or data interface for each of the shelves 902, 904, 906. The connectors 910 may represent a male/female interface, plugs, or other connectors that self-align. For example, the connectors 910 may be spring loaded or biased to connect contact points of the power/data systems of the charging shelf 900. In one embodiment, wiring, cables, or buses associated with the connectors 910 may run through a support 914. The support 914 may be integrated with or connected to each of the shelves 902, 904, 906.

In one embodiment, the charging shelves 900 include a C or U-shaped piece (depending on positioning) configured to secure one or more charging bases (see FIGS. 3 and 4). Other fasteners or connectors, such as bolts, screws, magnets, ties, or interconnects may be utilized. Each of the shelves 902 includes the bottom panel 909 (or base), a back 911, and a top panel 912 (or top). In one embodiment, each of the shelves 902, 904, 906 may represent an individual shelf module or tier that may be integrated or interconnected. For example, the bottom panel 909, back 911, and top panel 912 may be screwed, bolted, or otherwise attached together.

The charging shelves 900 may also include a connector 916. The connector 916 may allow charging bases to electrically connect to the charging shelves 900. In one embodiment, the connector 916 may represent a power plug that interfaces with a receptacle of the charging bases. The connector 916 may also include conductors that are aligned to create an electrical/data connection between the charging shelves 900 and the charging bases. The charging shelves 900 include a power connection or interface for receiving power from any number of sources (e.g., alternative current wall outlet, battery system, etc.). In another embodiment, the bottom panel 909 may include an inductive charger for charging flameless candles 918 placed directly or indirectly on the bottom panel 910. The connector 916 may also be referred to as a charging port that interfaces with the charging bases.

The charging shelves 900 may include holes for mounting the charging shelves 900 to a wall, supports, furniture, or so forth.

Figure 12:
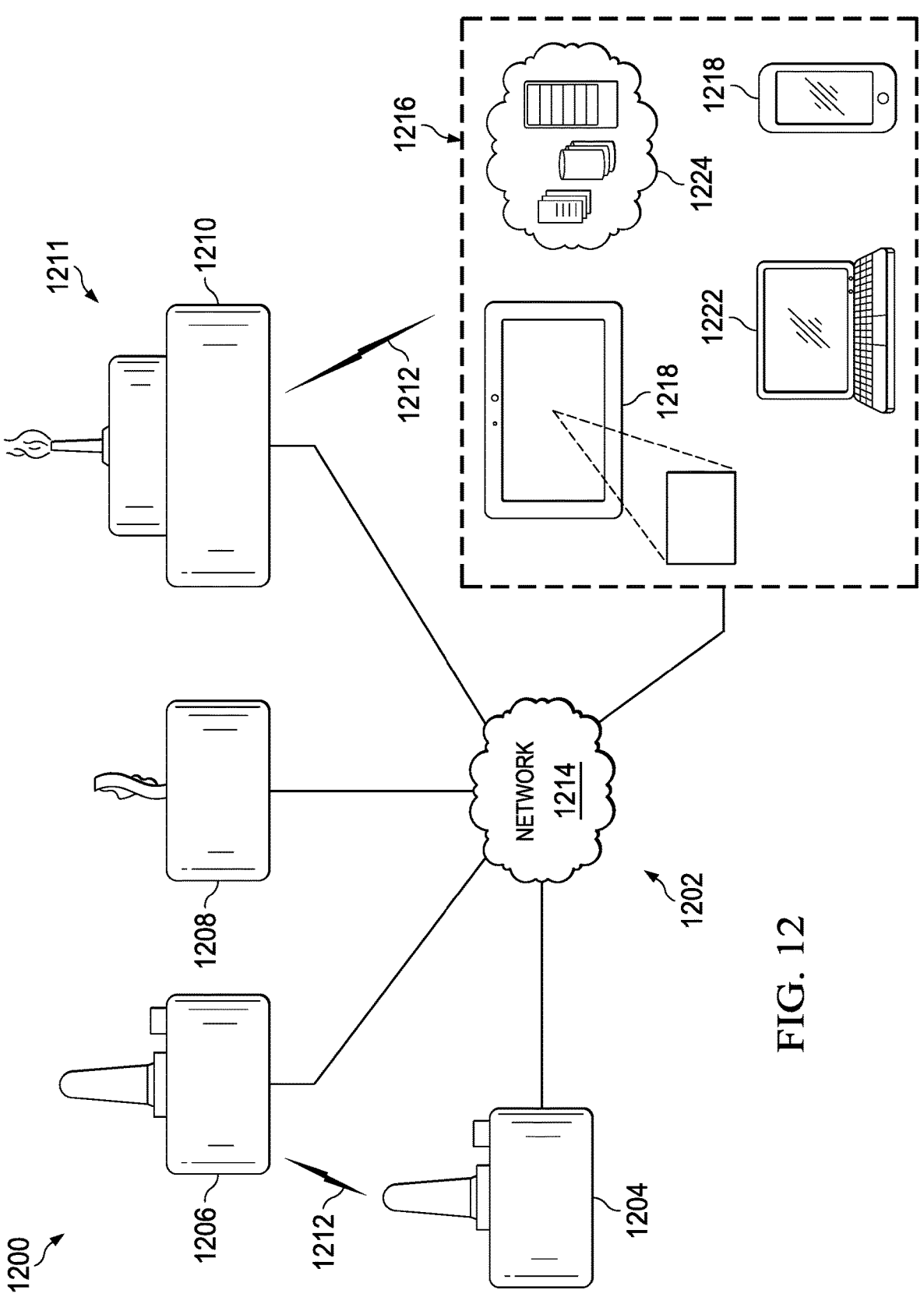
FIG. 12 is a pictorial representation of a flameless candle environment in accordance with an illustrative embodiment.

FIG. 12 is a pictorial representation of a flameless candle environment 1200 in accordance with an illustrative embodiment. The flameless candle environment 1200 may include a flameless candle network 1202. In one embodiment, the flameless candle network 1202 may include flameless candles 1204, 1206, 1208, 1210 (jointly flameless candles 1211) shown for illustrative purposes. The flameless candles 1211 may represent any number of flameless candles (e.g., from one to one thousand). The flameless candles 1211 may communicate directly through a wireless signal 1212 or through one or more networks, such as network 1214.

The flameless candles 1211 may be controlled utilizing any number of devices 1216. In one embodiment, the devices 1216 may include a smart phone 1218, a tablet 1220, a laptop 1222, and a cloud system 1224. The devices 1216 may communicate directly with the flameless candles 1211 or through one or more networks, such as the network 1214. The devices 1216 may execute one or more applications for controlling the flameless candles 1211. For example, the applications may execute instructions, programs, scripts, or other sets of instructions to configure the flameless candles 1211 in real-time or when positioned on a charging base, charging shelf, charging rack, or so forth. The devices 1216 may also include a remote control. In one embodiment, the remote control is specially configured to control the flameless candles 1211. For example, the remote control may utilize an infrared signal that may be utilized to individually control the brightness, color, flicker, flame height, ambient sensing, submersion, holographic properties, and so forth. The devices 1216 may also include a charging base, shelf, or rack with a user interface as are herein described.

The wireless signal 1212 may represent any number of short-range or long-range wireless or infrared signals, such as Bluetooth, Wi-Fi, near-field communications, Zigbee, EnOcean (and the associated hardware/software), or so forth. In one embodiment, the flames candles 1211 of the flameless candle environment 1200 may form a mesh network for sending commands, software updates, settings, messages (e.g., battery status, performance, warnings, etc.), or other additional information.

In one embodiment, the flameless candles 1211 may be part of established groups so that a single control signal from one of the devices 1216 may control all of the flameless candles 1211 within that group to change color or candle performance or settings.

The cloud system 1224 (or other devices 1216) may act as a central control station for the flameless candles 1211. The cloud system 1214 may be controlled locally or remotely. For example, the cloud system 1214 may be utilized by management, administrators, or servers of larger restaurants, events, venues, nightclubs, or other locations. The cloud system 1214 may include any number of networks, servers, databases, data connections, processors, or so forth for controlling the flameless candles 1211. The flameless candles 1211 may also be utilized with the Internet of Things (IoT) functionality, standards, and protocols for messaging, remote sensing, and so forth.

In one embodiment, the cloud system 1224 may control how and when the flameless candles 1211 change settings based on movement, users, temperature, wind, presence of music, voice, and sound, and other ambient conditions. For example, the flicker rate of the flameless candles 1211 may change based on the beat/tempo of the music being played in the flameless candle environment 1200. The flameless candles may also capture audio to adjust the illumination based on footsteps, conversations, or other sounds or tones that are inaudible.

FIG. 13 is a flowchart of a process for processing instructions for a flameless candle in accordance with an illustrative embodiment. The process of FIG. 13 may be implemented for one or more of the flameless candles 100 of FIGS. 1-10 or the other described embodiments. For example, the process may be implemented by a charging rack, base, shelf, accessory, or system for one or more flameless/smart candles. For example, the process may be performed simultaneously, concurrently, or sequentially for numerous flameless candles (e.g., tens, hundreds, or thousands of flameless candles). Bulk setup for numerous flameless candles provides a unique and innovative way to program or setup numerous electronic candles at once.

In one embodiment, the process may begin by receiving a flameless candle on a charging base (step 1302). The charging base may be a portion of a larger charging rack. The process of FIG. 13 may be applied to the charging rack as well. The flameless candles may be placed on the charging base to be charged, synchronized, updated, stored, or for any number of other purposes. In one embodiment, the charging base may include receptacles, indentations, ports, cups, walls, grooves, or other defined areas for receiving the flameless candles. In another embodiment, the charging base may have a flat surface for receiving any number of flameless candles including various sizes, shapes, and configurations. Each flameless candle may or may not have an assigned location within the charging base. In one embodiment, step 1302 may include locking the flameless candle utilizing a locking system between the flameless candle and the charging base. For example, the charging base may utilize locking tabs on the charging base to interface with extensions on the base of the flameless candle that securely locks the flameless candle in place. Other locking mechanisms may also be utilized.

Next, the charging base performs charging (step 1304). In one embodiment, the flameless candle may charge the associated battery or other energy storage device of the flameless candles utilizing a physical connection that utilizes pins, contacts, or connectors of the flameless candle. In another embodiment, the charging base may utilize a wireless or inductive signal communicated from the charging base. For example, the flameless candles may each include inductive charging units. As noted, any number of flameless candles may be charged simultaneously. All or portions of the charging base may generate the power signal that charges the flameless candles. For example, the charging base may be composed of different charging sections that may cease generating the power signal once the flameless candles placed on that section are fully charged for more efficient operation. The flameless candles may include self-aligning pins, ports, or a charging interface that may physically interact with the charging base to perform or supplement the charging process.

The charging base may also recognize the flameless candles that are placed on the charging base. The identification may be performed by an assigned identifier, such as a serial number, name, make/model, Internet protocol address, hardware identifier, or so forth. In one embodiment, the charging base may record the identifier(s), time on the charger, utilization (e.g., hours used, mode implemented, etc.), battery status (e.g., charges level, battery degradation, maximum charge, time to charge, etc.), performance statistics, settings/instructions, and so forth.

Next, the charging base received instructions for controlling the flameless candle (step 1308). In one embodiment, the instructions may be received from a wireless device in communication with the charging base through an application. For example, the manager of a restaurant may utilize her smart phone and associated mobile application to set the instructions specifying brightness to a seven out of ten, the color to blue, and the flicker rate to random with a two second maximum. In another embodiment, the charging base may include a user interface of the base or rack for controlling the instructions. For example, the user interface may include a brightness, color, flicker rate, automatic shutdown time/time period, synchronization/network, and other applicable information, settings, and parameters. In another embodiment, settings, preferences, instructions, or programming established for a master candle may be shared with slave/associated candles.

Next, the charging base associates the instructions with the flameless candles placed on the charging base (step 1310). The instructions may be communicated utilizing a wireless or inductive connection (e.g., short, medium, or long range, etc.), a physical interface, or other wired or wireless connections, signals, protocols, or interfaces. The instructions may be communicated to each of the flameless candles placed on the specified charging base. In another embodiment, the instructions may be propagated from one charging base to another or from one flameless candle to another utilizing a mesh network, charging bases on a shelf/rack/device or in a location, candle identifiers, proximity, or so forth. In another embodiment, the flameless candles may be configured to propagate settings (e.g., light intensity, color, flicker rate, etc.) between candles. For example, a master candle may be programmed by a user (e.g., manager, hostess, administrator, homeowner, etc.) and the settings may be automatically propagated to individual or all flameless candles or from candle to candle utilizing the applicable transceivers.

FIG. 14 is a flowchart of a process for configuring flameless candles in accordance with an illustrative embodiment. The process of FIG. 14 may be performed by one or more flameless candles, charging base, charging shelf, charging rack, mobile candle application or device, or other applicable device referred to as a "system" for the purposes of FIG. 14.

The process may begin by receiving a selection of color configurations (step 1402). The color configurations are received for the flameless candles. The flameless candles may include light sources (e.g., LEDs, bulbs, lasers, solid-state emitters, etc.) that may be configured to emit any number of colors. The color configurations may specify one or more colors to be emitted by the flameless candles based on time of day, music, location, color of proximate flameless candles, control signals, and other applicable information and data. As previously noted, any number of different candle types, models, shapes, and configurations may be utilized as network devices or as stand-alone devices.

Next, the system receives a brightness configuration (step 1404). The brightness level of the flameless candles may be associated with a minimum and maximum output of the light sources of each of the flameless candles. For example, the brightness level may be specified by lumens, watts, battery power available, or other applicable measurements.

Next, the system receives a flicker rate (step 1406). The flicker rate may represent the approximate harmonic oscillation frequency of a wax candle with a real frame. Real flicker rates vary based on the diameter of the wick, wax utilized, air conditions, and so forth across a flame flicker spectrum. For example, the flicker rate may be approximately 5 Hz.

Next, the system receives other settings (step 1408). The other settings may represent information, such as wireless networks to connect to, receiving frequencies (e.g., control signals), automatic shut off times/time periods, and other applicable settings or user preferences that control the components of the flameless candles as well as the associated functionality. In one embodiment, the flameless candles may be configured to change colors every 15 minutes from yellow, red, orange, and blue. The color changes may be performed dramatically or using a gradual change to add to the ambience of the environment.

Next, the system receives thresholds (if any) (step 1410). The thresholds specify limitations for changing the settings and configuration of the flameless candles (e.g., color, brightness, flicker, rate, etc.). The thresholds may represent time periods, noise levels, light levels, control signals receive, or other applicable data and/or information. The thresholds may be associated with sensor measurements made by the flameless candles. The thresholds may be established by a user, default settings, or so forth.

Next, the settings and thresholds are communicated to the flameless candles (step 1408). The information and data may be communicated directly or indirectly (e.g., network, mesh communications, etc.). For example, the settings and thresholds may be communicated by a cellular phone through a Bluetooth or Wi-Fi signal.

The illustrative embodiments provide a safe and adaptable alternative to wax-based candles and other electronic candles. For example, the life cycle of the electronic candles as described are significant because of their rechargeable and reusable nature saving individuals, businesses, and organizations significant money. The illustrative embodiments utilize hermetically sealed and waterproof components to provide the highest ingress protection (IP) rating possible for electronic candles. For example, the electronic candles as well as their associated trade, base, or charging station may be dishwasher or sanitizer safe (i.e., waterproof). As a result, the flameless candles may be easily cleaned and/or sterilized without having to perform such a process for individual flameless candles. Flameless candles that have been previously floating, submerged, or otherwise wet or dirty may be placed on the associated charging base without individual drying or cleaning.

The illustrative embodiments have significant advantages over traditional wax-based candles. In particular, wax-based candles have a significantly limited life cycle, such as 8 to 10 hours of burn time. In addition, wax-based candles release chemicals that may stain surfaces or cause allergic reactions. The rechargeable nature of batteries described herein have numerous environmental and cost-savings advantages. The charging base's, shelves, and racks as described herein provide an effective way for collecting, charging, and synchronizing performance of the flameless candles. The charging base's may be interconnected or may interface with the shelves or racks as are herein described. As a result, both time and space are conserved.

Figure 15:
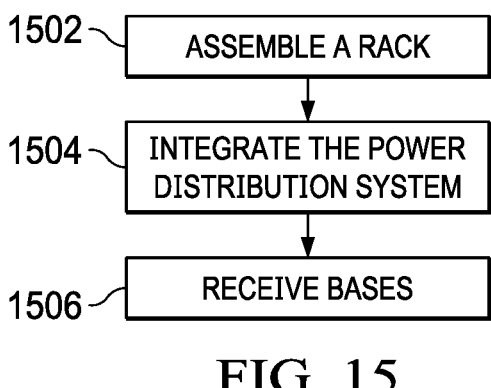
FIG. 15 is a flowchart of a process for assembling a rack in accordance with an illustrative embodiment.

FIG. 15 is a flowchart of a process for assembling a rack in accordance with an illustrative embodiment. The process of FIG. 15 may begin by assembling a rack. The rack may represent a tray or pan rack, tray truck, tray cart, holding cabinet, or other similar device utilized to store, secure, transport, or otherwise manage trays, pans, carts, equipment, or other items frequently managed by catering, event management, and entertainment groups, entities, organizations, or so forth. The rack may be mobile (e.g., including wheels, casters, bearings, rollers, etc.) allowing the electronic candles to be moved around. In another embodiment, the rack may be stationary and part of the backroom, stocking, or storage areas of the applicable location, facility, vehicle (e.g., boat, plane, bus, etc.). The rack may be assembled to different sizes and levels. For example, different levels or shelves may be added as needed as the needs of the user grow. For example, the frame may be configured to receive different levels utilizing tube or rectangular joints that are universally connected as part of the rack system.

In one embodiment, the process may begin by assembling a rack (step 1502). The rack may be assembled automatically by a robotic system, one or more users, or a combination of automatic and manual operations. The process of FIG. 15 may represent manufacturing or assembly of the rack. For example, different bases, supports, extensions, wires, shelves, covers, wheels/casters/rollers, or other components may be welded, adhered, connected (e.g., screws, bolts, tabs, interference fit, fasteners, etc.), molded, or otherwise integrated or connected. The rack may be shipped and received fully assembled, partially assembled, or requiring complete assembly. As noted, the rack may also be manufactured from various materials (e.g., metal/wire, plastic, polymers, wood, etc.).

In one embodiment, the process of FIG. 15 may be performed level by level for the rack. For example, each new level (or shelf) may be added as necessitated.

Next, the system integrates the power distribution system (step 1504). In one embodiment, the power distribution system includes one or more power plugs (e.g., 120 V power plug), transformers, power plugs/adapters, interfaces, contacts, wires, wiring harnesses, circuit breakers, and so forth. In one embodiment, each level of the rack may include one or more plugs for the bases to be powered for charging the electronic candles. In another embodiment, the wires and contacts may be integrated within the rack and the bases. For example, spring connectors of the shelves of the rack may interface with contacts of the bases to easily charge the electronic candles. Any number of stops, tabs, indicators, or other components may be utilized to ensure that the trays are electrically connected when inserted into the rack. The frame of the rack may also include the power distribution components including wires for distributing power, adapters, transformers, interfaces (for the bases), and connectors for connection between the different levels or bases.

Next, the system receives bases (step 1506). Each level of the rack may be configured to receive one or more bases. In one embodiment, two bases are used per level. For example, the size and weight of the candles when mounted on the base may make using two bases ideal. The bases may be carried horizontally or vertically using an integrated handle. The bases are sized and shaped to be highly maneuverable and carried even by smaller individuals or those without significant arm strength. As a result, the bases may be easily inserted or removed from the rack with charging happening automatically (e.g., alignment of electrical interfaces, contacts, and connectors) or in response to plus being inserted into ports, receptacles, or interfaces of the bases. In one embodiment, the bases may include the power distribution step and as a result, steps 1504 and 1506 may be performed together.

Figure 16:
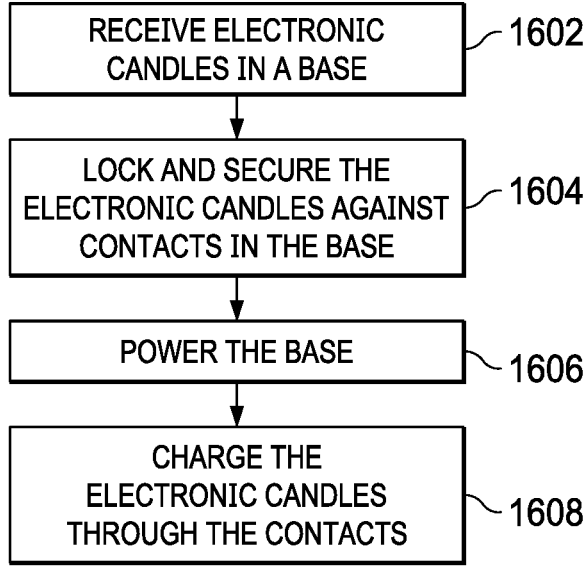
FIG. 16 is a flowchart of a process for charging electronic candles in accordance with an illustrative embodiment.

FIG. 16 is a flowchart of a process for charging electronic candles in accordance with an illustrative embodiment. The process of FIG. 16 may be implemented by a charging and storage rack as is described herein. The rack with all of its components and features may also be referred to as a "system." The rack may be mobile (e.g., mounted on wheels, casters, rollers, slides, crane system, etc.). The rack may also represent a tray, cart, or other similar system. The rack may be specifically manufactured for storing and charging electronic candles or may be a standard rack that may be retrofitted to store and charge the electronic candles. For example, the rack may represent a tray commonly used by catering, hospitality, entertainment, cruise ships, or other groups. In one embodiment, the rack may include an integrated power distribution system for powering multiple bases (e.g., 10 bases). The rack may also be retrofitted with any number of power distribution systems, such as power cords, transformers, circuit breakers, and so forth. The system may be performed based on interaction with one or more users. The system may also interact with one or more robotic arms or feeder systems that may insert and load the electronic candles.

In one embodiment, the process may begin by receiving electronic candles in a base (step 1602). In one embodiment, the electronic candles may be positioned and rotated within individual receptacles of the base to lock the electronic candles into place. The bases and racks may act as a distribution and charging platform for loading and unloading the electronic candles for movement, storage, charging, programming, and so forth.

Next, the system locks and secures the electronic candles against contacts in the base (step 1604). Connectors or charging pens of the electronic candles may be aligned with connectors within the receptacles of the base to charge the electronic candles. The shape and structure of the receptacles are such that the electronic candles may only be inserted and aligned in a way to securely store and charge the electronic candles. For example, when rotated in a clockwise direction, the electronic candles may be locked into position so that they cannot be removed from the receptacles of the base without being rotated in a counterclockwise direction. The receptacles may also include magnets, locking mechanisms (e.g., locking tabs, latches, pins, etc.), and other connectors.

Next, the system powers the base (step 1606). The base may be automatically powered so that any electronic candles inserted into the base begin to receive an electrical current immediately for charging the electronic candles. In other embodiments, the base may be powered by logic of the rack at a predefined time to charge the electronic candles associated with the one or more bases in the rack. The base may alternatively require a specific number of electronic candles to be locked and secured to begin charging (e.g. three or more electronic candles). The power draw of the system may be sufficiently low such that even a rack completely loaded with electronic candles may be charged.

Next, the system charges the electronic candles through the contacts (step 1608). The electronic candles may be charged while being securely stored. For example, the bases may be removed from the rack and carried horizontally, vertically, at an angle, or in any orientation (including upside down) without the electronic candles falling from the base. As a result, the electronic candles may be moved in areas with limited space due to people, structures (e.g., tables, walls, hallways, rooms, equipment, stairways, railings, etc.).

The system may also update or synchronize actions of all or portions of the electronic candles. For example, settings, configuration, or software utilized by the electronic candles may be updated through the system. Communications may occur through the physical connection to the electronic candles or wirelessly. For example, candles on a selected based may be configured for a specific light color, intensity, flicker rate, and so forth. Additional features and functions of the electronic candles may also be programmed as needed (e.g., motion detection, Wi-Fi repeating, mesh networks, payment portals, ordering interfaces, network components, etc.).

In one embodiment, before the process of FIG. 16 may be implemented, the bases may be slid into shelves of the rack system. For example, the shelves may be formed from rails. In other embodiments, the charging rack, rails, shelves, or the bases may include wheels, bearings, or sliders for reducing friction when inserting and removing the charging bases. The bases may be electrically connected to the rack system utilizing power plugs and connectors, connection interfaces between the bases and rack system, or so forth. The bases may have a number of different sizes and shapes configured to fit within the rack.

Figure 17:
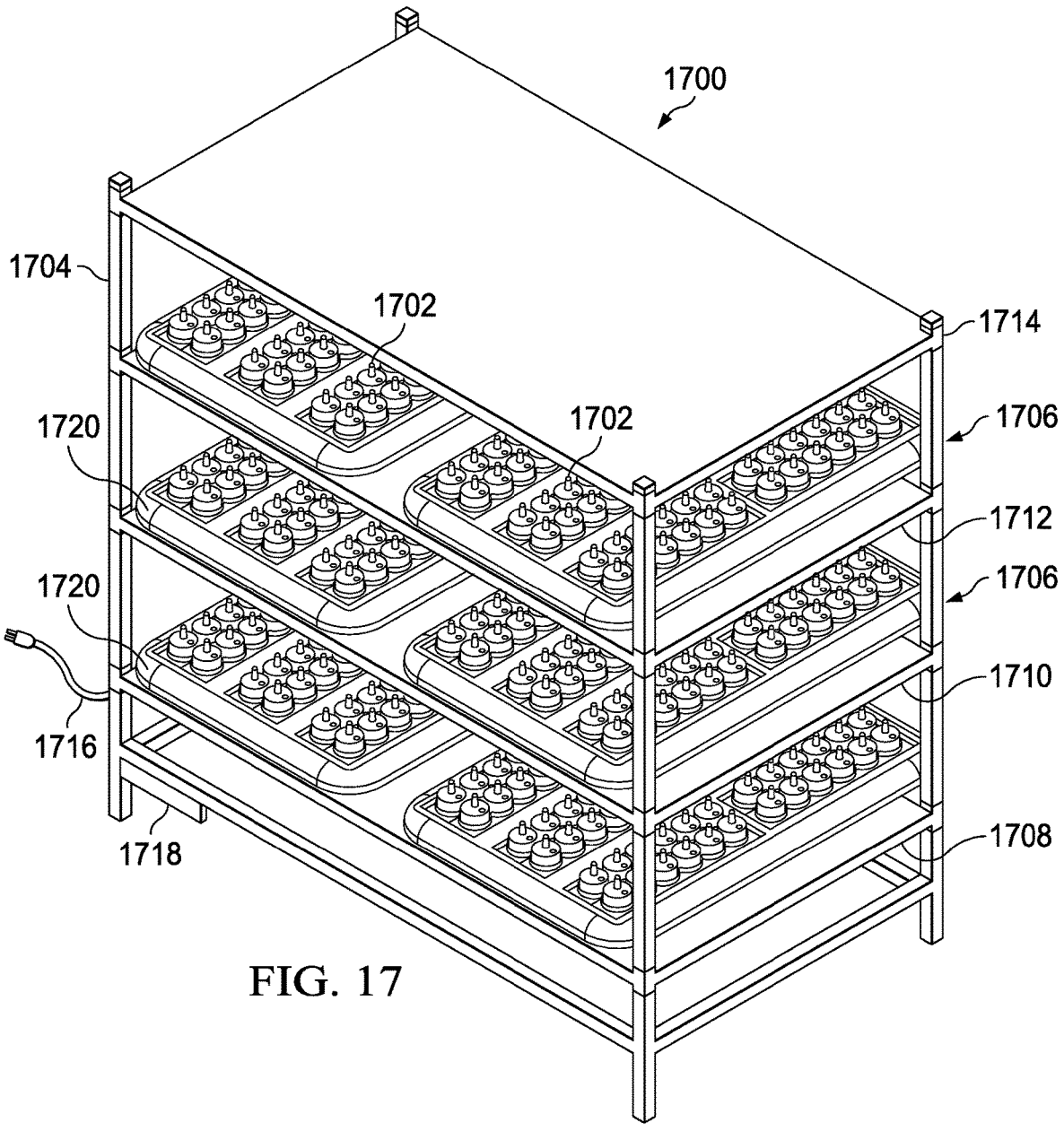
FIG. 17 is a fixed rack 1700 for electronic candles 1702 in accordance with an illustrative embodiment.

FIG. 17 is a fixed rack 1700 for electronic candles 1702 in accordance with an illustrative embodiment. The fixed rack 1700 may include a frame 1704, shelves 1706 (i.e. first shelf 1708, second shelf 1710, third shelf 1712, etc.), connectors 1714, power cord 1716, and power system 1718. Various bases 1720 with electronic candles 1702 may be set on, connected to, or utilized with the fixed rack 1700. The fixed rack 1700 may be manufactured with the various described components. In another embodiment, the fixed rack 1700 may represent built-in or modular racks of a back room, storage, warehousing, or other area that may be retrofitted to include the various described components.

The frame 1704 supports the structure of the rack. The frame 1704 may include bases or feet (not shown) that support the frame 1704 as it sits on the floor, ground, or other surface. Bases may also be utilized to provide a non-slip surface and distribute weight.

The shelves 1706 may be added as needed to the fixed rack 1700. For example, initially, the fixed rack 1700 may only include the first shelf 1708 initially. Additional units including shelves 1710 and 1712 may be added as needed. In one embodiment, each of the shelves 1706 may also include the corresponding portion of the frame 1704. Each of the shelves 1708, 1710 and 1712 may be attached to each other (or to the frame 1704) utilizing the connectors 1714. In one embodiment, the connectors 1714 may include circular, square, or rectangular openings for receiving tubing or other portions of the frame 1704/shelves 1706. The connectors 1714 may utilize an interference fit, screws, bolts, tabs, or so forth.

The power cord 1716 may connect to a traditional wall outlet. The power cord 1716 may be of any length and may even be retractable. The power system 1718 may include any number of transformers or adapters. The power system 1718 may include wires and contacts for electrically interfacing with the shelves 1706, bases 1720, and/or frame 1704.

In another embodiment, the shelves 1706 may include interfaces, ports, or contacts for powering the bases 1720. As a result, the bases 1720 may be placed on or slid onto the shelves 1706 allowing the bases 1720 to be electrically and/or communicatively connected to the fixed rack. For example, the interfaces or contacts integrated with the shelves 1706 may self-align with corresponding contacts, ports, or interfaces of the bases 1720. In one embodiment, each of the shelves 706 and the corresponding electronic candles 1702 may be programmed or configured independently so that the electronic candles 1702 of the fixed rack 1700 performed differently when utilized.

The illustrative embodiments are not to be limited to the particular embodiments and examples described herein. In particular, the illustrative embodiments contemplate numerous variations in the type of ways in which embodiments of the invention may be applied to flameless or electronic candles. The various figures, embodiments, steps, and methods may be combined in any order and combination regardless of restrictions (whether naturally or artificially imposed). The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments disclosed with greater particularity.

27

28

What is claimed is:

1. A method for charging electronic candles, comprising:

receiving a plurality of electronic candles in one or more charging bases, wherein the plurality of electronic candles are locked in place in the one or more charging bases;

receiving at least two charging bases with the plurality of electronic candles within a row of a frame of a charging rack, the charging rack includes multiple rows, the charging rack with the charging bases is rollable between a plurality of different locations; and electrically connecting the one or more charging bases to a power system integrated with the frame of the charging rack to charge the plurality of electronic candles through the one or more charging bases.

2. The method of claim 1, wherein the one or more charging bases include a plurality of receptacles, and wherein each of the receptacles includes contacts that interface with each of the plurality of electronic candles to perform charging and lock each of the plurality of candles in place.

3. The method of claim 1, further comprising:

updating the software of the plurality of electronic candles when connected to the charging rack.

4. The method of claim 1, wherein settings including a color, flicker rate, and brightness of the plurality of electronic candles are set for the candles while electrically connected to the charging rack.

5. The method of claim 4, wherein the settings are configured utilizing a remote control.

6. The method of claim 4, wherein the settings are configured through the electrical connection, the plurality of bases, and the plurality of electronic candles.

7. The method of claim 1, wherein the one or more charging bases are automatically electrically connected to the power system of the charging rack through a power interface when the one or more charging bases are placed on the charging rack.

8. The method of claim 7, wherein the one or more charging bases electrically connect to the power system of the charger utilizing contacts that do not require user interaction.

9. The method of claim 1, further comprising:

configuring settings of the plurality of electronic candles based on historical settings.

10. A candle system, comprising:

a charging rack including a frame for receiving a plurality of bases within each row of the frame, wherein the charging rack includes a plurality of electrical interfaces for connecting with the plurality of bases, and wherein the charging rack includes a plurality of rows and is mounted on wheels for moving the candle system between locations; and the plurality of bases securing a plurality of electronic candles and charging the plurality of electronic candles when connected to the charging rack, wherein each of the plurality of bases include a plurality of receptacles locking the plurality of candles into place for charging and storage.

11. The candle system of claim 10, wherein the charging rack is mounted on wheels for moving the plurality of bases and associated plurality of electronic candles.

12. The candle system of claim 10, wherein the plurality of electrical interfaces are utilized to update software implemented by the plurality of electronic candles.

13. The candle system of claim 10, further comprising:

one or more remote controls for updating settings of the plurality of flameless candles being charged by the charging rack;

wherein the plurality of bases are automatically powered for charging the plurality of electronic candles when the plurality of bases are docked within the frame of the charging rack, plurality of bases include an electrical interface and wherein the charging rack includes a plurality of connectors for electrically connecting to the electrical interface of each of the plurality of bases.

14. The candle system of claim 13, wherein the settings include at least brightness, color, and flicker rate.

15. The electronic candle system of claim 13, wherein the plurality of electrical interfaces connect to a power system including a plug or a battery.

16. A charging rack, comprising:

a plurality of vertical supports of a frame, wherein a plurality of wheels extend from the plurality of supports for moving the electronic candle rack between locations;

a plurality of horizontal supports of the frame extending between the plurality of vertical supports for supporting a plurality of charging bases within the frame, each of the plurality of horizontal supports is configured to receive at least two of the charging bases, the plurality of charging bases are configured to lock a plurality of electronic candles into position for charging and movement; and a plurality of electrical interfaces for power the plurality of charging bases to recharge the plurality of electronic candles.

17. The charging rack of claim 16, further comprising:

logic for interfacing with the plurality of candles through the charging bases to update software or settings.

18. The charging rack of claim 17, wherein the settings include at least brightness, color, and flicker rate.

19. The charging rack of claim 16, one or more remote controls for updating settings of the plurality of flameless candles being charged by the charging rack.

20. The charging rack of claim 19, further comprising:

a power system including at least a wall plug for charging of the plurality of electronic candles through the charging bases, and wherein the plurality of charging bases electrically interface with the power system of the charger utilizing contacts that do not require user interaction.

* * * * *